(12) United States Patent
Matas et al.

(10) Patent No.: US 9,223,323 B2
(45) Date of Patent: Dec. 29, 2015

(54) USER FRIENDLY INTERFACE FOR CONTROL UNIT

(75) Inventors: Michael James Matas, San Francisco, CA (US); David Sloo, Menlo Park, CA (US); Michael Plitkins, Berkeley, CA (US); Anthony Michael Fadell, Portola Valley, CA (US); Matthew Lee Rogers, Los Gatos, CA (US); John Benjamin Filson, Mountain View, CA (US); Brian Huppi, San Francisco, CA (US); Fred Bould, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 13/033,573

(22) Filed: Feb. 23, 2011

(65) Prior Publication Data

US 2012/0130546 A1     May 24, 2012

Related U.S. Application Data

(60) Provisional application No. 61/415,771, filed on Nov. 19, 2010, provisional application No. 61/429,093, filed on Dec. 31, 2010.

(51) Int. Cl.
*G05B 13/00*     (2006.01)
*G05D 23/19*     (2006.01)
(Continued)

(52) U.S. Cl.
CPC ............... *G05D 23/19* (2013.01); *F24D 19/10* (2013.01); *F24D 19/1084* (2013.01);
(Continued)

(58) Field of Classification Search
CPC ..................................................... F24F 11/00
USPC ......................................................... 700/276
See application file for complete search history.

(56) References Cited

U.S. PATENT DOCUMENTS 2,558,648 A     6/1951 Warner
3,991,357 A     11/1976 Kaminski
(Continued)

FOREIGN PATENT DOCUMENTS

CA     2202008         2/2000
DE     19609390 A1     9/1997
(Continued)

OTHER PUBLICATIONS

Energy Joule, Ambient Devices, 2011, [retrieved on Aug. 1, 2012]. Retrieved from: http://web.archive.org/web/20110723210421/http://www.ambientdevices.com/products/energyjoule.html, 3 pages.
(Continued)

*Primary Examiner* — Robert Fennema
*Assistant Examiner* — Anthony Whittington
(74) *Attorney, Agent, or Firm* — Kilpatrick Townsend & Stockton LLP

(57) ABSTRACT

A user-friendly programmable thermostat is described that includes a circular body having a large central display surrounded by a ring that can be rotated an pressed inward by a user so as to receive user input in a simple elegant fashion. Different colors can be displayed to the user to indicate currently active HVAC functions, and different shades of colors can be displayed to a user to indicate an estimated amount of time and/or energy for reaching a target temperature. The thermostat is wall mountable and is made up of a head unit removeably mounted to a backplate. A locking mechanism can be provided so as to increase security against unauthorized removal of the head unit. The backplate can be adapted to be mounted on a wall so as to be level, for example by including a bubble level on the backplate. One or more vents are preferably located on the sides of the body, such as in a gap beneath the translatably mounted ring, and/or in a gap between the head unit and the backplate. The target temperature for the device can be altered in response to sensing rotation of the rotating ring, and the programmed schedule can be displayed to and altered by the user in response to sensing rotation of the ring and the translational movement of the ring. Historical information such as temperature and cost information can be displayed to a user in response to sensing rotating of the rotating ring. One or more device settings can be displayed to and edited by a user in response to sensing rotating of the rotating member and the translational movement. According to some embodiments, text characters can be entered by the user.

20 Claims, 20 Drawing Sheets

(51) Int. Cl.
*F24F 11/00* (2006.01)
*F24D 19/10* (2006.01)
*H04W 4/00* (2009.01)

(52) U.S. Cl.
CPC ........ *F24F 11/0009* (2013.01); *F24F 11/0012* (2013.01); *G05D 23/1902* (2013.01); *G05D 23/1917* (2013.01); *H04W 4/005* (2013.01); *F24F 2011/0068* (2013.01); *F24F 2011/0073* (2013.01); *Y10T 29/49826* (2015.01)

(56) References Cited

U.S. PATENT DOCUMENTS

| | | |
|---|---|---|
| 4,223,831 A | 9/1980 | Szarka |
| 4,316,577 A | 2/1982 | Adams et al. |
| 4,335,847 A | 6/1982 | Levine |
| 4,408,711 A | 10/1983 | Levine |
| 4,613,139 A | 9/1986 | Robinson, II |
| 4,615,380 A | 10/1986 | Beckey |
| 4,621,336 A | 11/1986 | Brown |
| 4,674,027 A | 6/1987 | Beckey |
| 4,685,614 A | 8/1987 | Levine |
| 4,751,961 A | 6/1988 | Levine et al. |
| 4,768,706 A | 9/1988 | Parfitt |
| 4,847,781 A | 7/1989 | Brown, III et al. |
| 4,897,798 A | 1/1990 | Cler |
| 4,971,136 A | 11/1990 | Mathur et al. |
| 4,997,029 A | 3/1991 | Otsuka et al. |
| 5,005,365 A | 4/1991 | Lynch |
| D321,903 S | 11/1991 | Chepaitis |
| 5,065,813 A | 11/1991 | Berkeley et al. |
| 5,088,645 A | 2/1992 | Bell |
| 5,115,967 A | 5/1992 | Wedekind |
| 5,211,332 A | 5/1993 | Adams |
| 5,224,648 A | 7/1993 | Simon et al. |
| 5,224,649 A | 7/1993 | Brown et al. |
| 5,240,178 A | 8/1993 | Dewolf et al. |
| 5,244,146 A | 9/1993 | Jefferson et al. |
| D341,848 S | 11/1993 | Bigelow et al. |
| 5,294,047 A | 3/1994 | Schwer et al. |
| 5,303,612 A | 4/1994 | Odom et al. |
| 5,395,042 A | 3/1995 | Riley et al. |
| 5,415,346 A | 5/1995 | Bishop |
| 5,460,327 A | 10/1995 | Hill et al. |
| 5,462,225 A | 10/1995 | Massara et al. |
| 5,476,221 A | 12/1995 | Seymour |
| 5,482,209 A | 1/1996 | Cochran et al. |
| 5,485,954 A | 1/1996 | Guy et al. |
| 5,499,196 A | 3/1996 | Pacheco |
| 5,544,036 A | 8/1996 | Brown, Jr. et al. |
| 5,555,927 A | 9/1996 | Shah |
| 5,603,451 A | 2/1997 | Helander et al. |
| 5,611,484 A | 3/1997 | Uhrich |
| 5,627,531 A | 5/1997 | Posso et al. |
| 5,673,850 A | 10/1997 | Uptegraph |
| 5,761,083 A | 6/1998 | Brown, Jr. et al. |
| D396,488 S | 7/1998 | Kunkler |
| 5,779,143 A | 7/1998 | Michaud et al. |
| 5,782,296 A | 7/1998 | Mehta |
| 5,808,294 A | 9/1998 | Neumann |
| 5,808,602 A | 9/1998 | Sellers |
| 5,816,491 A | 10/1998 | Berkeley et al. |
| 5,902,183 A | 5/1999 | D'Souza |
| 5,909,378 A | 6/1999 | De Milleville |
| 5,918,474 A | 7/1999 | Khanpara et al. |
| 5,924,486 A | 7/1999 | Ehlers et al. |
| 5,931,378 A | 8/1999 | Schramm |
| 5,959,621 A | 9/1999 | Nawaz et al. |
| 5,973,662 A | 10/1999 | Singers et al. |
| 5,977,964 A | 11/1999 | Williams et al. |
| 6,020,881 A | 2/2000 | Naughton et al. |
| 6,032,867 A | 3/2000 | Dushane et al. |
| 6,062,482 A | 5/2000 | Gauthier et al. |
| 6,066,843 A | 5/2000 | Scheremeta |
| D428,399 S | 7/2000 | Kahn et al. |
| 6,095,427 A | 8/2000 | Hoium et al. |
| 6,098,893 A | 8/2000 | Berglund et al. |
| 6,122,603 A | 9/2000 | Budike, Jr. |
| 6,164,374 A | 12/2000 | Rhodes et al. |
| 6,206,295 B1 | 3/2001 | LaCoste |
| 6,211,921 B1 | 4/2001 | Cherian et al. |
| 6,213,404 B1 | 4/2001 | Dushane et al. |
| 6,216,956 B1 | 4/2001 | Ehlers et al. |
| 6,286,764 B1 | 9/2001 | Garvey et al. |
| 6,298,285 B1 | 10/2001 | Addink et al. |
| 6,311,105 B1 | 10/2001 | Budike, Jr. |
| D450,059 S | 11/2001 | Itou |
| 6,318,639 B1 | 11/2001 | Toth |
| 6,349,883 B1 | 2/2002 | Simmons et al. |
| 6,351,693 B1 | 2/2002 | Monie et al. |
| 6,356,204 B1 | 3/2002 | Guindi et al. |
| 6,370,894 B1 | 4/2002 | Thompson et al. |
| 6,415,205 B1 | 7/2002 | Myron et al. |
| 6,453,687 B2 | 9/2002 | Sharood et al. |
| D464,660 S | 10/2002 | Weng et al. |
| 6,478,233 B1 | 11/2002 | Shah |
| 6,502,758 B2 | 1/2003 | Cottrell |
| 6,513,723 B1 | 2/2003 | Mueller et al. |
| 6,519,509 B1 | 2/2003 | Nierlich et al. |
| D471,825 S | 3/2003 | Peabody |
| 6,574,581 B1 | 6/2003 | Bohrer et al. |
| 6,595,430 B1 | 7/2003 | Shah |
| 6,619,055 B1 | 9/2003 | Addy |
| 6,622,925 B2 | 9/2003 | Carner et al. |
| D480,401 S | 10/2003 | Kahn et al. |
| 6,636,197 B1 | 10/2003 | Goldenberg et al. |
| 6,641,054 B2 | 11/2003 | Morey |
| 6,641,055 B1 | 11/2003 | Tiernan |
| 6,643,567 B2 | 11/2003 | Kolk et al. |
| 6,644,557 B1 | 11/2003 | Jacobs |
| 6,645,066 B2 | 11/2003 | Gutta et al. |
| D485,279 S | 1/2004 | DeCombe |
| 6,726,112 B1 | 4/2004 | Ho |
| D491,956 S | 6/2004 | Ombao et al. |
| 6,769,482 B2 | 8/2004 | Wagner et al. |
| 6,785,630 B2 | 8/2004 | Kolk et al. |
| 6,798,341 B1 | 9/2004 | Eckel et al. |
| D497,617 S | 10/2004 | Decombe et al. |
| 6,814,299 B1 | 11/2004 | Carey |
| 6,824,069 B2 | 11/2004 | Rosen |
| 6,851,621 B1 | 2/2005 | Wacker et al. |
| 6,864,879 B2 | 3/2005 | Nojima et al. |
| D503,631 S | 4/2005 | Peabody |
| 6,891,838 B1 | 5/2005 | Petite et al. |
| 6,909,921 B1 | 6/2005 | Bilger |
| 6,951,306 B2 | 10/2005 | DeLuca |
| D511,527 S | 11/2005 | Hernandez et al. |
| 6,975,958 B2 | 12/2005 | Bohrer et al. |
| 6,990,821 B2 | 1/2006 | Singh et al. |
| 7,000,849 B2 | 2/2006 | Ashworth et al. |
| 7,024,336 B2 | 4/2006 | Salsbury et al. |
| 7,028,912 B1 | 4/2006 | Rosen |
| 7,035,805 B1 | 4/2006 | Miller |
| 7,038,667 B1 | 5/2006 | Vassallo et al. |
| 7,055,759 B2 | 6/2006 | Wacker et al. |
| 7,083,109 B2 | 8/2006 | Pouchak |
| 7,108,194 B1 | 9/2006 | Hankins, II |
| 7,109,970 B1 | 9/2006 | Miller |
| 7,111,788 B2 | 9/2006 | Reponen |
| 7,114,554 B2 | 10/2006 | Bergman et al. |
| 7,135,965 B2 | 11/2006 | Chapman, Jr. et al. |
| 7,140,551 B2 | 11/2006 | de Pauw et al. |
| 7,141,748 B2 | 11/2006 | Tanaka et al. |
| 7,142,948 B2 | 11/2006 | Metz |
| 7,149,729 B2 | 12/2006 | Kaasten et al. |
| 7,152,806 B1 | 12/2006 | Rosen |
| 7,156,318 B1 | 1/2007 | Rosen |
| 7,159,789 B2 | 1/2007 | Schwendinger et al. |
| 7,159,790 B2 | 1/2007 | Schwendinger et al. |
| 7,181,317 B2 | 2/2007 | Amundson et al. |
| 7,188,482 B2 | 3/2007 | Sadegh et al. |
| 7,222,494 B2 | 5/2007 | Peterson et al. |
| 7,222,800 B2 | 5/2007 | Wruck |
| 7,225,054 B2 | 5/2007 | Amundson et al. |

(56) References Cited

U.S. PATENT DOCUMENTS

| | | |
|---|---|---|
| D544,877 S | 6/2007 | Sasser |
| 7,258,280 B2 | 8/2007 | Wolfson |
| D550,691 S | 9/2007 | Hally et al. |
| 7,264,175 B2 | 9/2007 | Schwendinger et al. |
| 7,274,972 B2 | 9/2007 | Amundson et al. |
| 7,287,709 B2 | 10/2007 | Proffitt et al. |
| 7,289,887 B2 | 10/2007 | Rodgers |
| 7,299,996 B2 | 11/2007 | Garrett et al. |
| 7,302,642 B2 | 11/2007 | Smith et al. |
| 7,333,880 B2 | 2/2008 | Brewster et al. |
| 7,346,467 B2 | 3/2008 | Bohrer et al. |
| D566,587 S | 4/2008 | Rosen |
| 7,379,791 B2 | 5/2008 | Tamarkin et al. |
| RE40,437 E | 7/2008 | Rosen |
| 7,418,663 B2 | 8/2008 | Pettinati et al. |
| 7,427,926 B2 | 9/2008 | Sinclair et al. |
| 7,434,742 B2 | 10/2008 | Mueller et al. |
| 7,451,937 B2 | 11/2008 | Flood et al. |
| 7,455,240 B2 | 11/2008 | Chapman, Jr. et al. |
| 7,460,690 B2 | 12/2008 | Cohen et al. |
| 7,469,550 B2 | 12/2008 | Chapman, Jr. et al. |
| D588,152 S | 3/2009 | Okada |
| 7,509,753 B2 | 3/2009 | Nicosia et al. |
| D589,792 S | 4/2009 | Clabough et al. |
| D590,412 S | 4/2009 | Saft et al. |
| D593,120 S | 5/2009 | Bouchard et al. |
| 7,537,171 B2 | 5/2009 | Mueller et al. |
| D594,015 S | 6/2009 | Singh et al. |
| D595,309 S | 6/2009 | Sasaki et al. |
| 7,555,364 B2 | 6/2009 | Poth et al. |
| D596,194 S | 7/2009 | Vu et al. |
| D597,101 S | 7/2009 | Chaudhri et al. |
| 7,558,648 B2 | 7/2009 | Hoglund et al. |
| D598,463 S | 8/2009 | Hirsch et al. |
| 7,571,014 B1 | 8/2009 | Lambourne et al. |
| 7,571,865 B2 | 8/2009 | Nicodem et al. |
| 7,575,179 B2 | 8/2009 | Morrow et al. |
| D599,810 S | 9/2009 | Scalisi et al. |
| 7,584,899 B2 | 9/2009 | de Pauw et al. |
| 7,600,694 B2 | 10/2009 | Helt et al. |
| D603,277 S | 11/2009 | Clausen et al. |
| D603,421 S | 11/2009 | Ebeling et al. |
| D604,740 S | 11/2009 | Matheny et al. |
| 7,614,567 B2 | 11/2009 | Chapman et al. |
| 7,620,996 B2 | 11/2009 | Torres et al. |
| D607,001 S | 12/2009 | Ording |
| 7,624,931 B2 | 12/2009 | Chapman, Jr. et al. |
| 7,634,504 B2 | 12/2009 | Amundson |
| 7,641,126 B2 | 1/2010 | Schultz et al. |
| 7,644,869 B2 | 1/2010 | Hoglund et al. |
| 7,667,163 B2 | 2/2010 | Ashworth et al. |
| D613,301 S | 4/2010 | Lee et al. |
| D614,194 S | 4/2010 | Guntaur et al. |
| D614,196 S | 4/2010 | Guntaur et al. |
| 7,693,582 B2 | 4/2010 | Bergman et al. |
| 7,702,424 B2 | 4/2010 | Cannon et al. |
| 7,703,694 B2 | 4/2010 | Mueller et al. |
| D614,976 S | 5/2010 | Skafdrup et al. |
| D615,546 S | 5/2010 | Lundy et al. |
| D616,460 S | 5/2010 | Pearson et al. |
| 7,721,209 B2 | 5/2010 | Tilton |
| 7,726,581 B2 | 6/2010 | Naujok et al. |
| D619,613 S | 7/2010 | Dunn |
| 7,784,704 B2 | 8/2010 | Harter |
| 7,802,618 B2 | 9/2010 | Simon et al. |
| D625,325 S | 10/2010 | Vu et al. |
| D625,734 S | 10/2010 | Kurozumi et al. |
| D626,133 S | 10/2010 | Murphy et al. |
| 7,823,076 B2 | 10/2010 | Borovsky et al. |
| RE41,922 E | 11/2010 | Gough et al. |
| 7,845,576 B2 | 12/2010 | Siddaramanna et al. |
| 7,848,900 B2 | 12/2010 | Steinberg et al. |
| 7,854,389 B2 | 12/2010 | Ahmed |
| D630,649 S | 1/2011 | Tokunaga et al. |
| 7,890,195 B2 | 2/2011 | Bergman et al. |
| 7,900,849 B2 | 3/2011 | Barton et al. |
| 7,904,209 B2 | 3/2011 | Podgorny et al. |
| 7,904,830 B2 | 3/2011 | Hoglund et al. |
| 7,908,116 B2 | 3/2011 | Steinberg et al. |
| 7,908,117 B2 | 3/2011 | Steinberg et al. |
| 7,913,925 B2 | 3/2011 | Ashworth |
| D638,835 S | 5/2011 | Akana et al. |
| D640,269 S | 6/2011 | Chen |
| D640,273 S | 6/2011 | Arnold et al. |
| D640,278 S | 6/2011 | Woo |
| D640,285 S | 6/2011 | Woo |
| D641,373 S | 7/2011 | Gardner et al. |
| 7,984,384 B2 | 7/2011 | Chaudhri et al. |
| D643,045 S | 8/2011 | Woo |
| 8,010,237 B2 | 8/2011 | Cheung et al. |
| 8,019,567 B2 | 9/2011 | Steinberg et al. |
| 8,037,022 B2 | 10/2011 | Rahman et al. |
| D648,735 S | 11/2011 | Arnold et al. |
| D651,529 S | 1/2012 | Mongell et al. |
| 8,090,477 B1 | 1/2012 | Steinberg |
| 8,091,375 B2 | 1/2012 | Crawford |
| 8,091,794 B2 | 1/2012 | Siddaramanna et al. |
| 8,131,207 B2 | 3/2012 | Hwang et al. |
| 8,131,497 B2 | 3/2012 | Steinberg et al. |
| 8,131,506 B2 | 3/2012 | Steinberg et al. |
| 8,136,052 B2 | 3/2012 | Shin et al. |
| D656,950 S | 4/2012 | Shallcross et al. |
| D656,952 S | 4/2012 | Weir et al. |
| 8,156,060 B2 | 4/2012 | Borzestowski et al. |
| 8,166,395 B2 | 4/2012 | Omi et al. |
| D658,674 S | 5/2012 | Shallcross et al. |
| 8,180,492 B2 | 5/2012 | Steinberg |
| 8,185,164 B2 | 5/2012 | Kim |
| 8,195,313 B1 | 6/2012 | Fadell et al. |
| D663,743 S | 7/2012 | Tanghe et al. |
| D663,744 S | 7/2012 | Tanghe et al. |
| D664,559 S | 7/2012 | Ismail et al. |
| 8,219,249 B2 | 7/2012 | Harrod et al. |
| 8,223,134 B1 | 7/2012 | Forstall et al. |
| 8,234,581 B2 | 7/2012 | Kake |
| D664,978 S | 8/2012 | Tanghe et al. |
| D665,397 S | 8/2012 | Naranjo et al. |
| 8,243,017 B2 | 8/2012 | Brodersen et al. |
| 8,253,704 B2 | 8/2012 | Jang |
| 8,253,747 B2 | 8/2012 | Niles et al. |
| 8,280,536 B1 | 10/2012 | Fadell et al. |
| 8,281,244 B2 | 10/2012 | Neuman et al. |
| D671,136 S | 11/2012 | Barnett et al. |
| 8,316,022 B2 | 11/2012 | Matsuda et al. |
| D673,171 S | 12/2012 | Peters et al. |
| D673,172 S | 12/2012 | Peters et al. |
| 8,341,557 B2 | 12/2012 | Pisula et al. |
| 8,442,695 B2 | 5/2013 | Imes et al. |
| 2001/0052052 A1 | 12/2001 | Peng |
| 2002/0005435 A1 | 1/2002 | Cottrell |
| 2002/0022991 A1 | 2/2002 | Sharood et al. |
| 2003/0034898 A1 | 2/2003 | Shamoon et al. |
| 2003/0042320 A1 | 3/2003 | Decker |
| 2003/0112262 A1 | 6/2003 | Adatia et al. |
| 2003/0231001 A1 | 12/2003 | Bruning |
| 2004/0015504 A1 | 1/2004 | Ahad et al. |
| 2004/0034484 A1 | 2/2004 | Solomita, Jr. et al. |
| 2004/0055446 A1 | 3/2004 | Robbin et al. |
| 2004/0067731 A1* | 4/2004 | Brinkerhoff et al. ......... 454/325 |
| 2004/0074978 A1 | 4/2004 | Rosen |
| 2004/0095237 A1 | 5/2004 | Chen et al. |
| 2004/0164238 A1 | 8/2004 | Xu et al. |
| 2004/0249479 A1 | 12/2004 | Shorrock |
| 2004/0256472 A1 | 12/2004 | DeLuca |
| 2004/0260427 A1 | 12/2004 | Wimsatt |
| 2004/0262410 A1 | 12/2004 | Hull |
| 2005/0040250 A1* | 2/2005 | Wruck ............................ 236/51 |
| 2005/0043907 A1 | 2/2005 | Eckel et al. |
| 2005/0055432 A1 | 3/2005 | Rodgers |
| 2005/0071780 A1 | 3/2005 | Muller et al. |
| 2005/0090915 A1 | 4/2005 | Geiwitz |
| 2005/0103875 A1 | 5/2005 | Ashworth et al. |
| 2005/0119766 A1 | 6/2005 | Amundson et al. |
| 2005/0119793 A1 | 6/2005 | Amundson et al. |

(56) References Cited

U.S. PATENT DOCUMENTS

| | | |
|---|---|---|
| 2005/0120181 A1 | 6/2005 | Arunagirinathan et al. |
| 2005/0128067 A1 | 6/2005 | Zakrewski |
| 2005/0150968 A1 | 7/2005 | Shearer |
| 2005/0159847 A1 | 7/2005 | Shah et al. |
| 2005/0189429 A1 | 9/2005 | Breeden |
| 2005/0192915 A1 | 9/2005 | Ahmed et al. |
| 2005/0194456 A1 | 9/2005 | Tessier et al. |
| 2005/0199737 A1 | 9/2005 | De Pauw et al. |
| 2005/0204997 A1 | 9/2005 | Fournier |
| 2005/0279840 A1 | 12/2005 | Schwendinger et al. |
| 2005/0279841 A1 | 12/2005 | Schwendinger et al. |
| 2005/0280421 A1 | 12/2005 | Yomoda et al. |
| 2006/0000919 A1 | 1/2006 | Schwendinger et al. |
| 2006/0186214 A1 | 8/2006 | Simon et al. |
| 2006/0196953 A1 | 9/2006 | Simon et al. |
| 2007/0001830 A1 | 1/2007 | Dagci et al. |
| 2007/0045430 A1 | 3/2007 | Chapman et al. |
| 2007/0045433 A1 | 3/2007 | Chapman et al. |
| 2007/0045444 A1 | 3/2007 | Gray et al. |
| 2007/0050732 A1 | 3/2007 | Chapman et al. |
| 2007/0057079 A1 | 3/2007 | Stark et al. |
| 2007/0114295 A1 | 5/2007 | Jenkins |
| 2007/0115902 A1 | 5/2007 | Shamoon et al. |
| 2007/0132503 A1 | 6/2007 | Nordin |
| 2007/0157639 A1 | 7/2007 | Harrod |
| 2007/0158442 A1 | 7/2007 | Chapman et al. |
| 2007/0158444 A1 | 7/2007 | Naujok et al. |
| 2007/0173978 A1 | 7/2007 | Fein et al. |
| 2007/0220907 A1* | 9/2007 | Ehlers ............................. 62/126 |
| 2007/0221741 A1 | 9/2007 | Wagner et al. |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0246553 A1* | 10/2007 | Morrow et al. ............ 236/46 R |
| 2007/0257120 A1 | 11/2007 | Chapman et al. |
| 2007/0278320 A1 | 12/2007 | Lunacek et al. |
| 2007/0296280 A1 | 12/2007 | Sorg et al. |
| 2008/0006709 A1 | 1/2008 | Ashworth et al. |
| 2008/0015740 A1 | 1/2008 | Osann |
| 2008/0015742 A1 | 1/2008 | Kulyk et al. |
| 2008/0048046 A1 | 2/2008 | Wagner et al. |
| 2008/0054082 A1 | 3/2008 | Evans et al. |
| 2008/0099568 A1 | 5/2008 | Nicodem et al. |
| 2008/0155915 A1* | 7/2008 | Howe et al. ................. 52/220.3 |
| 2008/0191045 A1 | 8/2008 | Harter |
| 2008/0215240 A1* | 9/2008 | Howard et al. ............... 701/213 |
| 2008/0221737 A1 | 9/2008 | Josephson et al. |
| 2008/0245480 A1 | 10/2008 | Knight et al. |
| 2008/0273754 A1 | 11/2008 | Hick et al. |
| 2008/0290183 A1 | 11/2008 | Laberge et al. |
| 2008/0317292 A1 | 12/2008 | Baker et al. |
| 2009/0001180 A1 | 1/2009 | Siddaramanna et al. |
| 2009/0001181 A1 | 1/2009 | Siddaramanna et al. |
| 2009/0099699 A1 | 4/2009 | Steinberg et al. |
| 2009/0125151 A1 | 5/2009 | Steinberg et al. |
| 2009/0140056 A1 | 6/2009 | Leen |
| 2009/0140057 A1 | 6/2009 | Leen |
| 2009/0140060 A1 | 6/2009 | Stoner et al. |
| 2009/0140062 A1 | 6/2009 | Amundson et al. |
| 2009/0140064 A1 | 6/2009 | Schultz et al. |
| 2009/0143916 A1 | 6/2009 | Boll et al. |
| 2009/0143918 A1 | 6/2009 | Amundson et al. |
| 2009/0171862 A1 | 7/2009 | Harrod et al. |
| 2009/0194601 A1 | 8/2009 | Flohr |
| 2009/0254225 A1 | 10/2009 | Boucher et al. |
| 2009/0259713 A1 | 10/2009 | Blumrich et al. |
| 2009/0261174 A1 | 10/2009 | Butler et al. |
| 2009/0263773 A1 | 10/2009 | Kotlyar et al. |
| 2009/0273610 A1 | 11/2009 | Busch et al. |
| 2009/0283603 A1 | 11/2009 | Peterson et al. |
| 2009/0297901 A1 | 12/2009 | Kilian et al. |
| 2009/0327354 A1 | 12/2009 | Resnick et al. |
| 2010/0019051 A1 | 1/2010 | Rosen |
| 2010/0025483 A1 | 2/2010 | Hoeynck et al. |
| 2010/0050004 A1 | 2/2010 | Hamilton, II et al. |
| 2010/0053464 A1 | 3/2010 | Otsuka |
| 2010/0070084 A1 | 3/2010 | Steinberg et al. |
| 2010/0070085 A1 | 3/2010 | Harrod et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070234 A1 | 3/2010 | Steinberg et al. |
| 2010/0070907 A1 | 3/2010 | Harrod et al. |
| 2010/0076605 A1 | 3/2010 | Harrod et al. |
| 2010/0076835 A1 | 3/2010 | Silverman |
| 2010/0084482 A1 | 4/2010 | Kennedy et al. |
| 2010/0106305 A1 | 4/2010 | Pavlak et al. |
| 2010/0107070 A1 | 4/2010 | Devineni et al. |
| 2010/0107076 A1 | 4/2010 | Grohman et al. |
| 2010/0107103 A1 | 4/2010 | Wallaert et al. |
| 2010/0163633 A1 | 7/2010 | Barrett et al. |
| 2010/0167783 A1 | 7/2010 | Alameh et al. |
| 2010/0168924 A1 | 7/2010 | Tessier et al. |
| 2010/0179704 A1 | 7/2010 | Ozog |
| 2010/0198425 A1 | 8/2010 | Donovan |
| 2010/0211224 A1 | 8/2010 | Keeling et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0282857 A1 | 11/2010 | Steinberg |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2011/0001812 A1 | 1/2011 | Kang et al. |
| 2011/0015797 A1 | 1/2011 | Gilstrap |
| 2011/0015798 A1 | 1/2011 | Golden et al. |
| 2011/0015802 A1 | 1/2011 | Imes |
| 2011/0016017 A1 | 1/2011 | Carlin et al. |
| 2011/0022242 A1 | 1/2011 | Bukhin et al. |
| 2011/0046756 A1 | 2/2011 | Park |
| 2011/0046792 A1 | 2/2011 | Imes et al. |
| 2011/0046805 A1 | 2/2011 | Bedros et al. |
| 2011/0046806 A1 | 2/2011 | Nagel et al. |
| 2011/0054710 A1 | 3/2011 | Imes et al. |
| 2011/0077758 A1 | 3/2011 | Tran et al. |
| 2011/0077896 A1 | 3/2011 | Steinberg et al. |
| 2011/0082594 A1* | 4/2011 | Dage et al. ................... 700/278 |
| 2011/0106328 A1 | 5/2011 | Zhou et al. |
| 2011/0151837 A1 | 6/2011 | Winbush, III |
| 2011/0160913 A1* | 6/2011 | Parker et al. ................. 700/276 |
| 2011/0166828 A1 | 7/2011 | Steinberg et al. |
| 2011/0167369 A1 | 7/2011 | van Os |
| 2011/0185895 A1 | 8/2011 | Freen |
| 2011/0290893 A1 | 12/2011 | Steinberg |
| 2011/0307103 A1 | 12/2011 | Cheung et al. |
| 2011/0307112 A1 | 12/2011 | Barrilleaux |
| 2012/0017611 A1 | 1/2012 | Coffel et al. |
| 2012/0036250 A1 | 2/2012 | Vaswani et al. |
| 2012/0053745 A1 | 3/2012 | Ng |
| 2012/0065935 A1 | 3/2012 | Steinberg et al. |
| 2012/0085831 A1 | 4/2012 | Kopp |
| 2012/0086562 A1 | 4/2012 | Steinberg |
| 2012/0089523 A1 | 4/2012 | Hurri et al. |
| 2012/0130546 A1 | 5/2012 | Matas et al. |
| 2012/0130547 A1 | 5/2012 | Fadell et al. |
| 2012/0131504 A1 | 5/2012 | Fadell et al. |
| 2012/0158350 A1 | 6/2012 | Steinberg et al. |
| 2012/0179300 A1 | 7/2012 | Warren et al. |
| 2012/0203379 A1 | 8/2012 | Sloo et al. |
| 2012/0221151 A1 | 8/2012 | Steinberg |
| 2012/0239207 A1 | 9/2012 | Fadell et al. |
| 2013/0024799 A1 | 1/2013 | Fadell et al. |
| 2013/0090767 A1 | 4/2013 | Bruck et al. |
| 2013/0099011 A1 | 4/2013 | Matsuoka et al. |

FOREIGN PATENT DOCUMENTS

| | | |
|---|---|---|
| EP | 207295 | 1/1987 |
| EP | 434926 A2 | 7/1991 |
| EP | 196069 | 12/1991 |
| EP | 720077 A2 | 7/1996 |
| EP | 802471 A2 | 10/1997 |
| EP | 802471 | 8/1999 |

(56) References Cited

FOREIGN PATENT DOCUMENTS

| | | |
|---|---|---|
| EP | 1065079 A2 | 1/2001 |
| EP | 1731984 A1 | 12/2006 |
| EP | 1283396 | 3/2007 |
| EP | 2157492 A2 | 2/2010 |
| EP | 1703356 | 9/2011 |
| GB | 2212317 B | 5/1992 |
| JP | 59106311 A | 6/1984 |
| JP | 01252850 | 10/1989 |
| JP | 09298780 | 11/1997 |
| JP | 10023565 | 1/1998 |
| JP | 2002087050 A | 3/2002 |
| JP | 2003054290 A | 2/2003 |
| KR | 1020070117874 | 3/2007 |
| NL | 1024986 C2 | 6/2005 |
| WO | 0248851 A2 | 6/2002 |
| WO | 2005019740 | 3/2005 |
| WO | 2008054938 | 5/2008 |
| WO | 2009073496 A2 | 6/2009 |
| WO | 2010033563 | 3/2010 |
| WO | 2011128416 A2 | 10/2011 |
| WO | 2011149600 | 12/2011 |
| WO | 2012024534 | 2/2012 |
| WO | 2013059671 | 4/2013 |

OTHER PUBLICATIONS

Honeywell CT2700, An Electronic Round Programmable Thermostat—User's Guide, Honeywell, Inc., 1997, 8 pages.
Honeywell CT8775A,C, The digital Round Non-Programmable Thermostats—Owner's Guide, Honeywell International Inc., 2003, 20 pages.
Honeywell T8700C, An Electronic Round Programmable Thermostat—Owner's Guide, Honeywell, Inc., 1997, 12 pages.
Honeywell T8775 The Digital Round Thermostat, Honeywell, 2003, 2 pages.
Honeywell T8775AC Digital Round Thermostat Manual No. 69-1679EF-1, www.honeywell.com/yourhome, Jun. 2004, pp. 1-16.
ICY 3815TT-001 Timer-Thermostat Package Box, ICY BV Product Bar Code No. 8717953007902, 2009, 2 pages.
Introducing the New Smart Si Thermostat, Datasheet [online]. Ecobee, No Date Given [retrieved on Feb. 25, 2013]. Retrieved from the Internet: <URL: https://www.ecobee.com/solutions/home/smart-si/>.
The Clever Thermostat, ICY BV Web Page, http://www.icy.nl/en/consumer/products/clever-thermostat, ICY BV, 2012, 1 page.
The Clever Thermostat User Manual and Installation Guide, ICY BV ICY3815 Timer-Thermostat, 2009, pp. 1-36.
U.S. Provisional U.S. Appl. No. 60/512,886, Volkswagen Rotary Knob for Motor Vehicle—English Translation of German Application filed Oct. 20, 2003.
Arens et al., "Demand Response Electrical Appliance Manager—User Interface Design, Development and Testing", Poster, Demand Response Enabling Technology Development, University of California Berkeley, Retrieved from dr.berkeley.edu/dream/posters/2005_6GUIposter.pdf, 2005, 1 page.
Arens et al., "Demand Response Enabled Thermostat—Control Strategies and Interface", Demand Response Enabling Technology Development Poster, University of California Berkeley, Retrieved from dr.berkeley.edu/dream/posters/2004_110EC_TstatPoster.pdf, 2004, 1 page.
Arens et al., "Demand Response Enabling Technology Development", Phase I Report: Jun. 2003-Nov. 2005, Jul. 27, P:/DemandRes/Uc Papers/DR-Phase1Report-Final DraftApril24-26.doc, University of California Berkeley, pp. 1-108.
Arens et al., "New Thermostat Demand Response Enabling Technology", Poster, University of California Berkeley, Jun. 10, 2004.
Auslander et al., "UC Berkeley DR Research Energy Management Group", Power Point Presentation, DR ETD Workshop, State of California Energy Commission, Jun. 11, 2007, pp. 1-35.
Chen et al., "Demand Response-Enabled Residential Thermostat Controls", Abstract, ACEEE Summer Study on Energy Efficiency in Buildings, Mechanical Engineering Dept. and Architecture Dept., University of California Berkeley, 2008, pp. 1-24 through 1-36.
Green, "Thermo Heat Tech Cool", Popular Mechanics Electronic Thermostat Guide, Oct. 1985, pp. 155-158.
Meier et al., "Thermostat Interface Usability: A Survey", Ernest Orlando Lawrence Berkeley National Laboratory, Environmental Energy Technologies Division, Berkeley California., Sep. 2010, pp. 1-73.
Peffer et al., "A Tale of Two Houses: The Human Dimension of Demand Response Enabling Technology from a Case Study of Adaptive Wireless Thermostat", Abstract, ACEEE Summer Study on Energy Efficiency in Buildings, Architecture Dept. and Mechanical Engineering Dept., University of California Berkeley., 2008, pp. 7-242 through 7-253.
Peffer et al., "Smart Comfort At Home: Design of a Residential Thermostat to Achieve Thermal Comfort, and Save Money and Peak Energy", University of California Berkeley, Mar. 2007, 1 page.
Salus, "S-Series Digital Thermostat Instruction Manual-ST620 Model No. Instruction Manual", www.salus-tech.com, Version 005, Apr. 29, 2010, 24 pages.
Sanford, "iPod (Click Wheel) (2004)", www.apple-history.com [retrieved on Apr. 9, 2012]. Retrieved from: http://apple-history.com/ipod, Apr. 9, 2012, 2 pages.
Wright et al., "DR ETD—Summary of New Thermostat, TempNode, & New Meter (UC Berkeley Project)", Power Point Presentation, Public Interest Energy Research, University of California Berkeley. Retrieved from: http://dr.berkeley.edu/dream/presentations/2005_6CEC.pdf, 2005, pp. 1-49.
Advanced Model Owner's Manual, Bay Web Thermostat, manual [online], [retrieved on Nov. 7, 2012]. Retrieved from the Internet: <URL:http://www.bayweb.com/wp-content/uploads/BW-WT4-2DOC.pdf>, Oct. 6, 2011, 31 pages.
Aprilaire Electronic Thermostats Model 8355 User's Manual, Research Products Corporation, Dec. 2000, 16 pages.
Braeburn 5300 Installer Guide, Braeburn Systems, LLC, Dec. 9, 2009, 10 pages.
Braeburn Model 5200, Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart Thermostat Installation Manual, Jun. 29, 2011, 20 pages.
Ecobee Smart Thermostat User Manual, May 11, 2010, 20 pages>.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige IAQ Product Data 2, Honeywell International, Inc., Jan. 12, 2012, 126 pages.
Honeywell Prestige THX9321 and TXH9421 Product Data, Honeywell International, Inc., 68-0311, Jan. 2012, 126 pages.
Honeywell Prestige THX9321-9421 Operating Manual, Honeywell International, Inc., Jul. 6, 2011, 120 pages.
Hunter Internet Thermostat Installation Guide, Hunter Fan Co., Aug. 14, 2012, 8 pages.
Lennox ComfortSense 5000 Owners Guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat Consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.

(56) References Cited

OTHER PUBLICATIONS

RobertShaw Product Manual 9825i2, Maple Chase Company, Jul. 17, 2006, 36 pages.

SCE Energy$mart Thermostat Study for Southern California Edison—Presentation of Study Results, Population Research Systems, Project #1010, Nov. 10, 2004, 51 pages.

SYSTXCCUIZ01-V Infinity Control Installation Instructions, Carrier Corp, May 31, 2012, 20 pages.

T8611G Chronotherm IV Deluxe Programmable Heat Pump Thermostat Product Data, Honeywell International Inc., Oct. 1997, 24 pages.

TB-PAC, TB-PHP, Base Series Programmable Thermostats, Carrier Corp, May 14, 2012, 8 pages.

The Perfect Climate Comfort Center PC8900A W8900A-C Product Data Sheet, Honeywell International Inc, Apr. 2001, 44 pages.

TP-PAC, TP-PHP, TP-NAC, TP-NHP Performance Series AC/HP Thermostat Installation Instructions, Carrier Corp, Sep. 2007, 56 pages.

Trane Communicating Thermostats for Fan Coil, Trane, May 2011, 32 pages.

Trane Communicating Thermostats for Heat Pump Control, Trane, May 2011, 32 pages.

Trane Install XL600 Installation Manual, Trane, Mar. 2006, 16 pages.

Trane XL950 Installation Guide, Trane, Mar. 2011, 20 pages.

Venstar T2900 Manual, Venstar, Inc., Apr. 2008, 113 pages.

Venstar T5800 Manual, Venstar, Inc., Sep. 7, 2011, 63 pages.

VisionPRO TH8000 Series Installation Guide, Honeywell International, Inc., Jan. 2012, 12 pages.

VisionPRO TH8000 Series Operating Manual, Honeywell International, Inc., Mar. 2011, 96 pages.

VisionPRO Wi-Fi Programmable Thermostat, Honeywell International, Inc. Operating Manual, Aug. 2012, 48 pages.

White Rodgers (Emerson) Model 1F81-261 Installation and Operating Instructions, White Rodgers, Apr. 15, 2010, 8 pages.

White Rodgers (Emerson) Model IF98EZ-1621 Homeowner's User Guide, White Rodgers, Jan. 25, 2012, 28 pages.

Allen, et al., "Real-Time Earthquake Detection and Hazard Assessment by ElarmS Across California", Geophysical Research Letters, vol. 36, L00B08, 2009, pp. 1-6.

Bourke, Server Load Balancing, O'Reilly & Associates, Inc., Aug. 2001, 182 pages.

De Almeida, et al., "Advanced Monitoring Technologies for the Evaluation of Demand-Side Management Programs", Energy, vol. 19, No. 6, 1994, pp. 661-678.

Deleeuw, "Ecobee WiFi Enabled Smart Thermostat Part 2: The Features Review", Retrieved from <URL: http://www.homenetworkenabled.com/content.php?136-ecobee-WiFi-enabled-Smart-Thermostat-Part-2-The-Features-review>, Dec. 2, 2011, 5 pages.

Gao, et al., "The Self-Programming Thermostat: Optimizing Setback Schedules Based on Home Occupancy Patterns", In Proceedings of the First ACM Workshop on Embedded Sensing Systems for Energy-Efficiency in Buildings, Nov. 3, 2009, 6 pages.

Gevorkian, "Alternative Energy Systems in Building Design", 2009, pp. 195-200.

Hoffman, et al., "Integration of Remote Meter Reading, Load Control and Monitoring of Customers' Installations for Customer Automation with Telephone Line Signaling", Electricity Distribution, 1989. CIRED 1989. 10th International Conference on, May 8-12, 1989, pp. 421-424.

Levy, "A Vision of Demand Response—2016", The Electricity Journal, vol. 19, Issue 8, Oct. 2006, pp. 12-23.

Loisos, et al., "Buildings End-Use Energy Efficiency: Alternatives to Compressor Cooling", California Energy Commission, Public Interest Energy Research, Jan. 2000, 80 pages.

Lopes, "Case Studies in Advanced Thermostat Control for Demand Response", AEIC Load Research Conference, St. Louis, MO, Jul. 2004, 36 pages.

Lu, et al., "The Smart Thermostat: Using Occupancy Sensors to Save Energy in Homes", In Proceedings of the 8th ACM Conference on Embedded Networked Sensor Systems, Nov. 3-5, 2010, pp. 211-224.

Martinez, "SCE Energy$mart Thermostat Program", Advanced Load Control Alliance, Oct. 5, 2004, 20 pages.

Matty, "Advanced Energy Management for Home Use", IEEE Transaction on Consumer Electronics, vol. 35, No. 3, Aug. 1989, pp. 584-588.

Motegi, et al., "Introduction to Commercial Building Control Strategies and Techniques for Demand Response", Demand Response Research Center, May 22, 2007, 35 pages.

Mozer, "The Neural Network House: An Environmental that Adapts to it's Inhabitants", AAAI Technical Report SS-98-02, 1998, pp. 110-114.

White, et al., "A Conceptual Model for Simulation Load Balancing", Proc. 1998 Spring Simulation Interoperability Workshop, 1998, 7 pages.

\* cited by examiner

ROTATE RING
COUNTER-CLOCKWISE

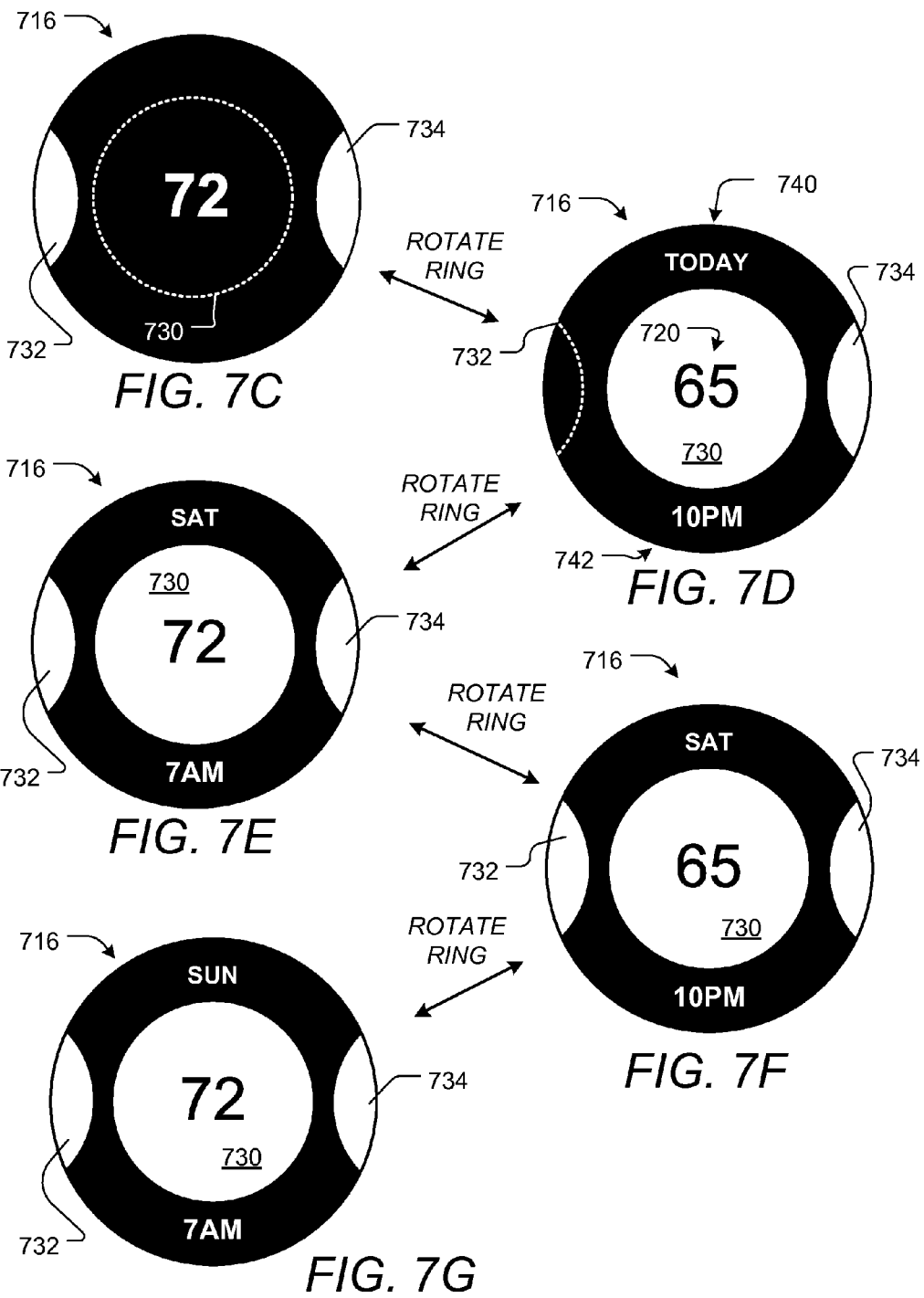

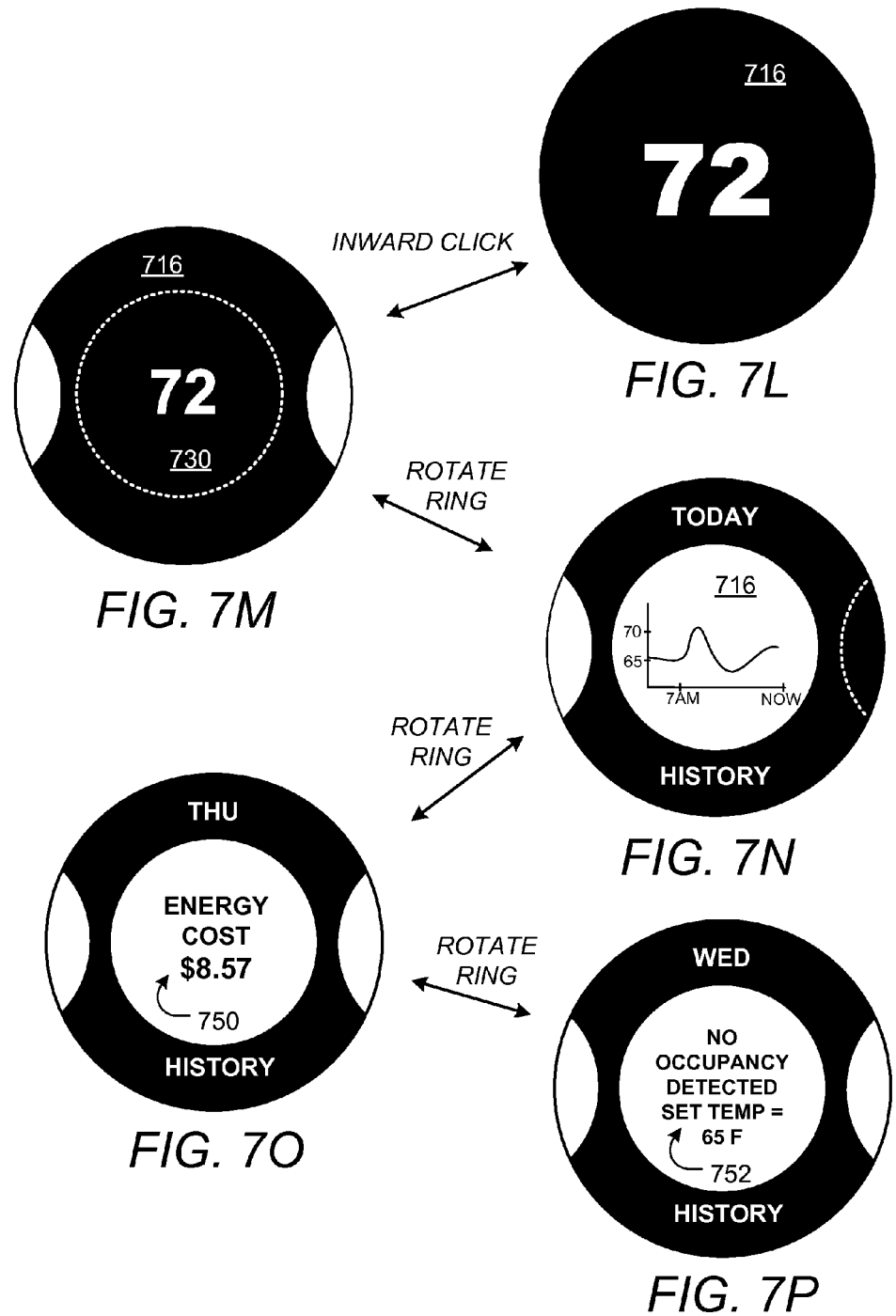

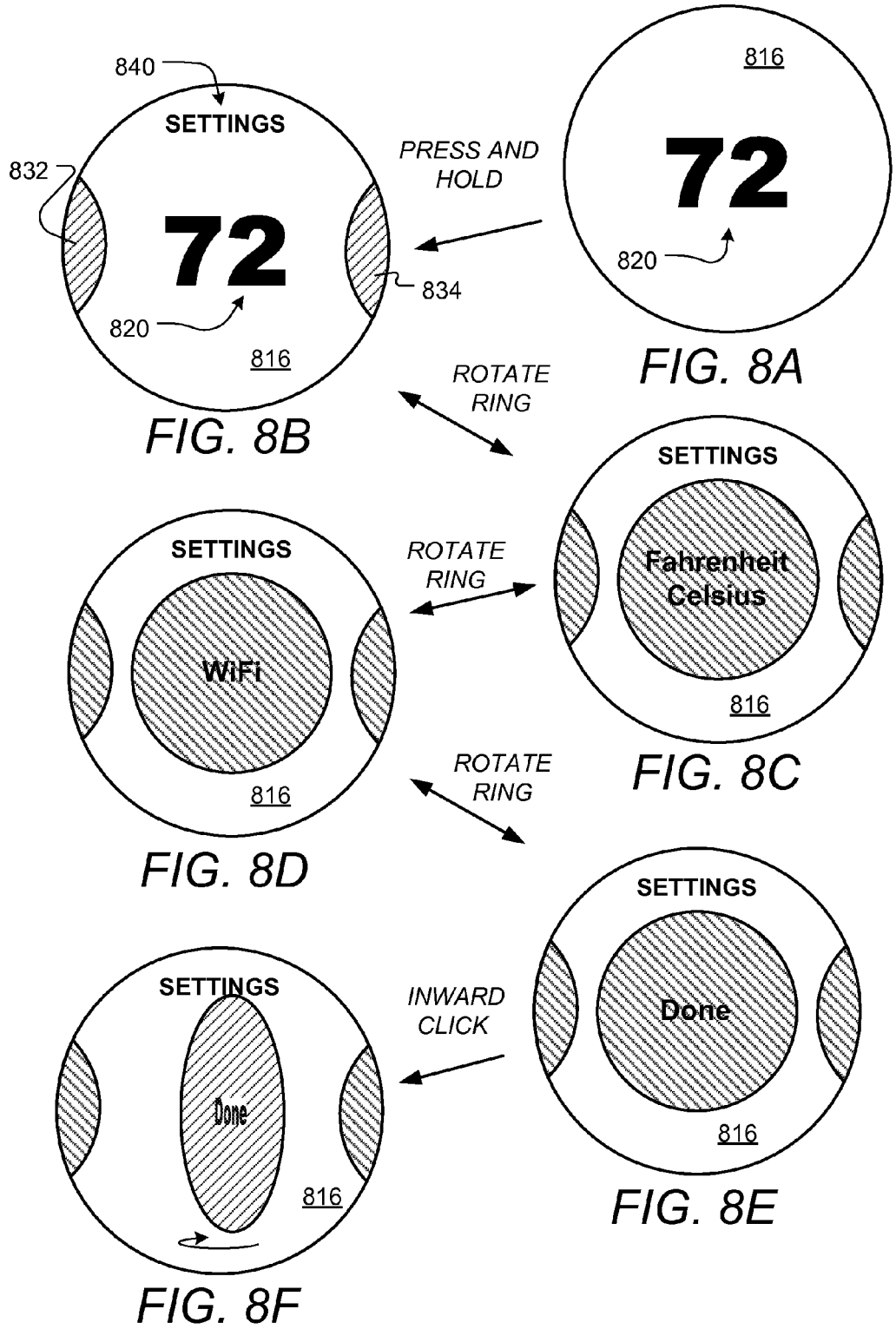

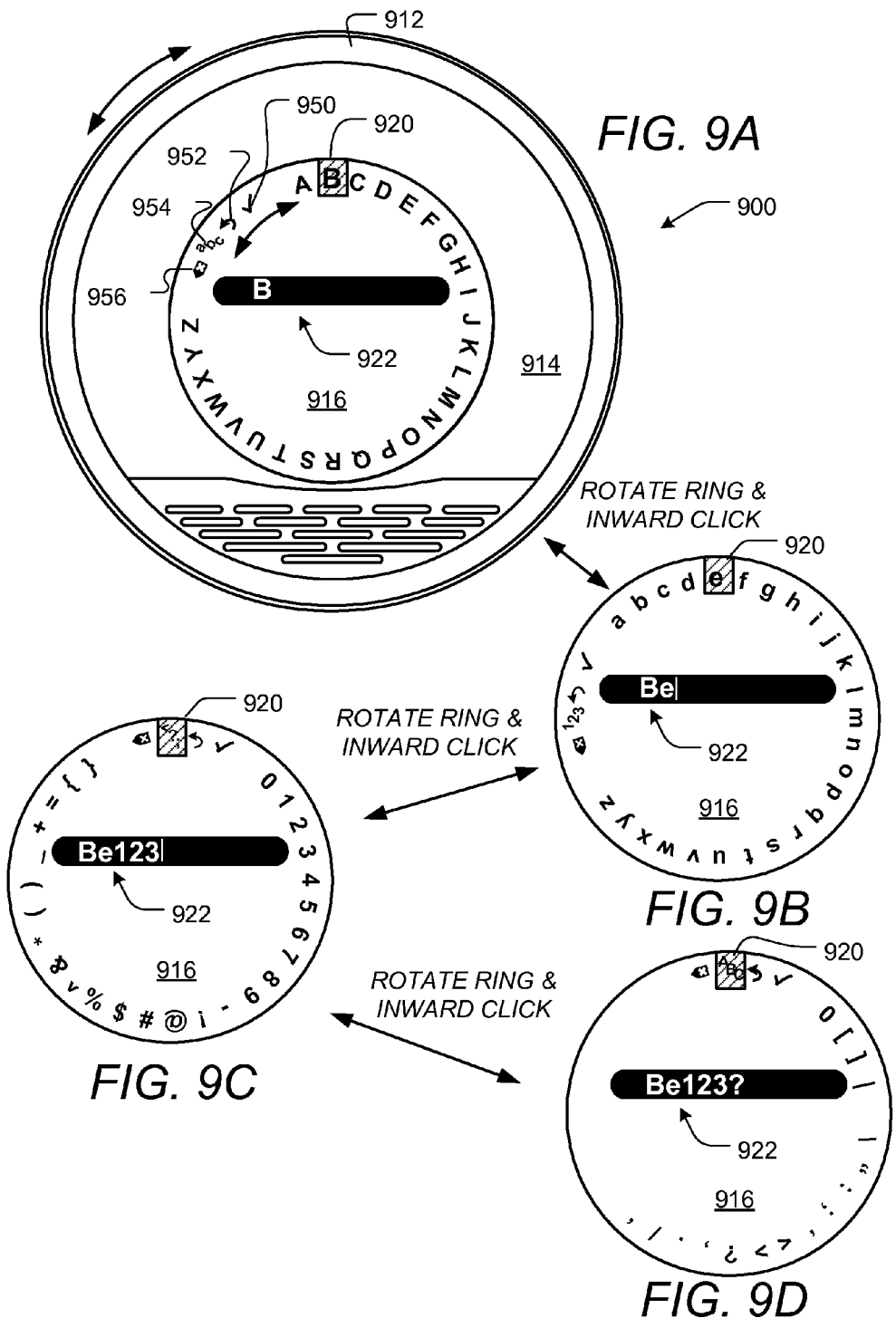

Enter U.S. ZIP CODE

Enter Date

USER FRIENDLY INTERFACE FOR CONTROL UNIT

CROSS-REFERENCE TO RELATED APPLICATIONS

This patent application claims the benefit of U.S. Prov. Ser. No. 61/415,771 filed Nov. 19, 2010; and of U.S. Prov. Ser. No. 61/429,093 filed Dec. 31, 2010. The subject matter of this patent specification also relates to the subject matter of the following commonly assigned applications: U.S. Ser. No. 12/881,430 filed Sep. 14, 2010; U.S. Ser. No. 12/881,463 filed Sep. 14, 2010; U.S. Ser. No. 12/984,602 filed Jan. 4, 2011; and U.S. Ser. No. 12/987,257 filed Jan. 10, 2011. Each of the above-referenced patent applications is incorporated by reference herein.

COPYRIGHT AUTHORIZATION

A portion of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This invention relates generally to the control of HVAC systems. More particularly, embodiments of this invention relate to user interfaces for thermostats, other HVAC controlling systems, and/or for other systems for controlling household utilities, resources or other systems.

While substantial effort and attention continues toward the development of newer and more sustainable energy supplies, the conservation of energy by increased energy efficiency remains crucial to the world's energy future. According to an October 2010 report from the U.S. Department of Energy, heating and cooling account for 56% of the energy use in a typical U.S. home, making it the largest energy expense for most homes. Along with improvements in the physical plant associated with home heating and cooling (e.g., improved insulation, higher efficiency furnaces), substantial increases in energy efficiency can be achieved by better control and regulation of home heating and cooling equipment. By activating heating, ventilation, and air conditioning (HVAC) equipment for judiciously selected time intervals and carefully chosen operating levels, substantial energy can be saved while at the same time keeping the living space suitably comfortable for its occupants.

Historically, however, most known HVAC thermostatic control systems have tended to fall into one of two opposing categories, neither of which is believed be optimal in most practical home environments. In a first category are many simple, non-programmable home thermostats, each typically consisting of a single mechanical or electrical dial for setting a desired temperature and a single HEAT-FAN-OFF-AC switch. While being easy to use for even the most unsophisticated occupant, any energy-saving control activity, such as adjusting the nighttime temperature or turning off all heating/cooling just before departing the home, must be performed manually by the user. As such, substantial energy-saving opportunities are often missed for all but the most vigilant users. Moreover, more advanced energy-saving settings are not provided, such as the ability to specify a custom temperature swing, i.e., the difference between the desired set temperature and actual current temperature (such as 1 to 3 degrees) required to trigger turn-on of the heating/cooling unit.

In a second category, on the other hand, are many programmable thermostats, which have become more prevalent in recent years in view of Energy Star (US) and TCO (Europe) standards, and which have progressed considerably in the number of different settings for an HVAC system that can be individually manipulated. Unfortunately, however, users are often intimidated by a dizzying array of switches and controls laid out in various configurations on the face of the thermostat or behind a panel door on the thermostat, and seldom adjust the manufacturer defaults to optimize their own energy usage. Thus, even though the installed programmable thermostats in a large number of homes are technologically capable of operating the HVAC equipment with energy-saving profiles, it is often the case that only the one-size-fits-all manufacturer default profiles are ever implemented in a large number of homes. Indeed, in an unfortunately large number of cases, a home user may permanently operate the unit in a "temporary" or "hold" mode, manually manipulating the displayed set temperature as if the unit were a simple, non-programmable thermostat. Thus, there is a need for a thermostat having an improved user interface that is simple, intuitive and easy to use such that the typical user is able to access many of the features such as programming energy-saving profiles.

At a more general level, because of the fact that human beings must inevitably be involved, there is a tension that arises between (i) the amount of energy-saving sophistication that can be offered by an HVAC control system, and (ii) the extent to which that energy-saving sophistication can be put to practical, everyday use in a large number of homes. Similar issues arise in the context of multi-unit apartment buildings, hotels, retail stores, office buildings, industrial buildings, and more generally any living space or work space having one or more HVAC systems. Other issues arise as would be apparent to one skilled in the art upon reading the present disclosure.

SUMMARY

According to some embodiments a programmable device for controlling an HVAC system is provided. The device is preferably a programmable thermostat and includes a rounded body; a rounded display mounted on the body and adapted to display information to a user; a rotating ring mounted on the body and adapted to receive user input; and a processing system adapted to control one or more HVAC functions according to a scheduled program, to display information on the rounded display and to receive user input from the rotating ring. According to some embodiments the body, display and ring are circular in shape, and the display is a dot matrix display using a display technology such as passive LCD, monochrome LCD, color LCD, organic light-emitting diode, or electronic ink. According to some embodiments different colors are displayed to the user to indicate currently active HVAC functions, and different shades of colors are displayed to a user to indicate an estimated amount of time and/or energy for reaching a target temperature.

According to some embodiments, the rounded body forms part of a head unit, and the device also includes a backplate adapted to be mounted on a wall. The head unit can be removeably mounted to the backplate, and a locking mechanism can be provided for locking the head unit to the back plate so as to increase security against unauthorized removal of the head unit. The backplate can be adapted to be mounted on a wall so as to be level, for example by including a bubble level on the backplate.

According to some embodiments, the rotating ring is mounted so as to be translatably moveable in a direction towards the base of the device so as to receive user input. One or more vents are preferably located on the sides of the body, such as in a gap beneath the translatably mounted ring, and/or in a gap between the head unit and the backplate.

According to some embodiments a method for interacting with a user with a programmable device for controlling an HVAC system is provided. The method includes displaying information to a user on a rounded dot-matrix display mounted on a rounded body of the programmable device; and receiving input from a user at least in part using rotating member mounted on the body and by sensing a translational movement of the rotating member toward the base of the device. The rotating member is preferably a rotating ring surrounding the rounded display. The device can be mounted on a wall on the base of the device.

According to some embodiments, the target temperature for the device can be altered in response to sensing rotation of the rotating ring, and the programmed schedule can be displayed to and altered by the user in response to sensing rotation of the ring and the translational movement of the ring. Historical information such as temperature and cost information can be displayed to a user in response to sensing rotation of the rotating ring. One or more device settings are displayed to and editable by a user in response to sensing rotating of the rotating member and the translational movement. According to some embodiments, text characters are received from a user using the rotating member and the translational movement.

According to some embodiments, a thermostat for controlling at least one HVAC function in an HVAC system is provided. The thermostat includes a back plate and a head unit. The back plate includes connectors adapted to connect to HVAC control wires, and a back plate processor adapted and programmed so as to turn on and turn off the HVAC function. The head unit includes a display adapted to display information to a user, a user input device for receiving input from a user, and a head unit processor adapted and programmed to control the display and processing received user input. The head unit and back plate are adapted to physically attach to each other so as to provide electrical connection between the head unit and back plate. According to some embodiments, the back plate is wall mountable and can include a temperature sensor. According to some embodiments, the back plate can maintain a set temperature when the head unit is not attached to the back plate. According to some embodiments, the back plate can control the HVAC system according to a series of programmed settings that take effect at different times of the day, when the head unit is not attached to the back plate. According to some embodiments the head unit also includes a rechargeable battery, and/or a wireless communication system. According to some embodiments, the head unit can update a thermodynamic model relating to an enclosure in which the HVAC system is installed.

As used herein the term "HVAC" includes systems providing both heating and cooling, heating only, cooling only, as well as systems that provide other occupant comfort and/or conditioning functionality such as humidification, dehumidification and ventilation.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIGS. 8A-F illustrates how other thermostat settings can be made using a user interface, according to some embodiments;

FIGS. 9A-D illustrate a thermostat having a user interface capable of entering textual information, according to some embodiments;

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
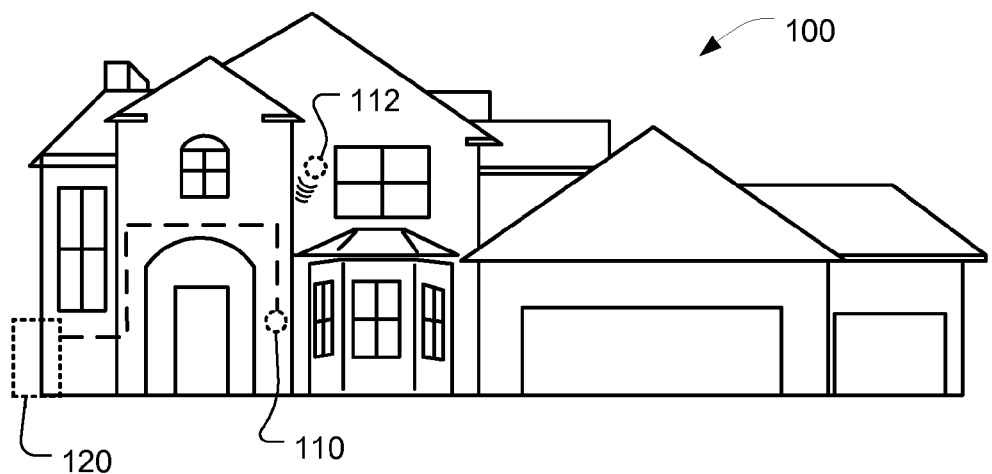
FIG. 1 is a diagram of an enclosure in which environmental conditions are controlled, according to some embodiments.

FIG. 1 is a diagram of an enclosure in which environmental conditions are controlled, according to some embodiments. Enclosure 100, in this example is a single-family dwelling. According to other embodiments, the enclosure can be, for example, a duplex, an apartment within an apartment building, a light commercial structure such as an office or retail store, or a structure or enclosure that is a combination of the above. Thermostat 110 controls HVAC system 120 as will be described in further detail below. According to some embodiments, the HVAC system 120 is has a cooling capacity less than about 5 tons. According to some embodiments, a remote device 112 wirelessly communicates with the thermostat 110 and can be used to display information to a user and to receive user input from the remote location of the device 112. According to some embodiments, the device 112 can be located outside of the enclosure 100.

Figure 2:
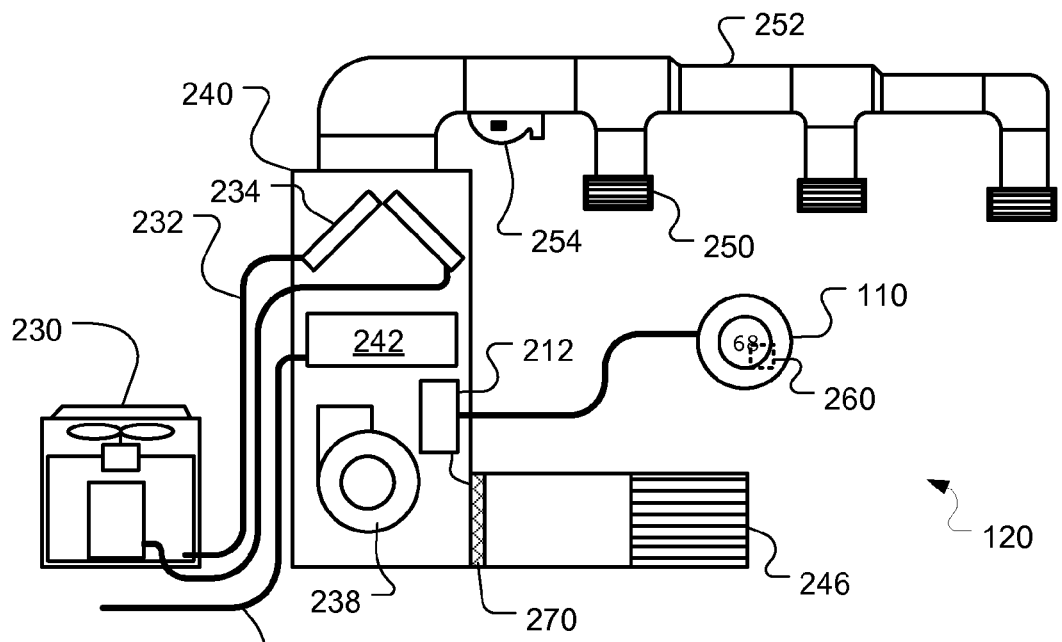
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type heating system, although according to other embodiments, other types of systems could be used. In heating, heating coils or elements 242 within air handler 240 provide a source of heat using electricity or gas via line 236. Cool air is drawn from the enclosure via return air duct 246 through filter 270, using fan 238 and is heated heating coils or elements 242. The heated air flows back into the enclosure at one or more locations via supply air duct system 252 and supply air grills such as grill 250. In cooling an outside compressor 230 passes gas such a Freon through a set of heat exchanger coils to cool the gas. The gas then goes to the cooling coils 234 in the air handlers 240 where it expands, cools and cools the air being circulated through the enclosure via fan 238. According to some embodiments a humidifier 254 is also provided. Although not shown in FIG. 2, according to some embodiments the HVAC system has other known functionality such as venting air to and from the outside, and one or more dampers to control airflow within the duct systems. The system is controlled by algorithms implemented via control electronics 212 that communicate with a thermostat 110. Thermostat 110 controls the HVAC system 120 through a number of control circuits. Thermostat 110 also includes a processing system 260 such as a microprocessor that is adapted and programmed to controlling the HVAC system and to carry out the techniques described in detail herein.

Figures 3A, 3B:
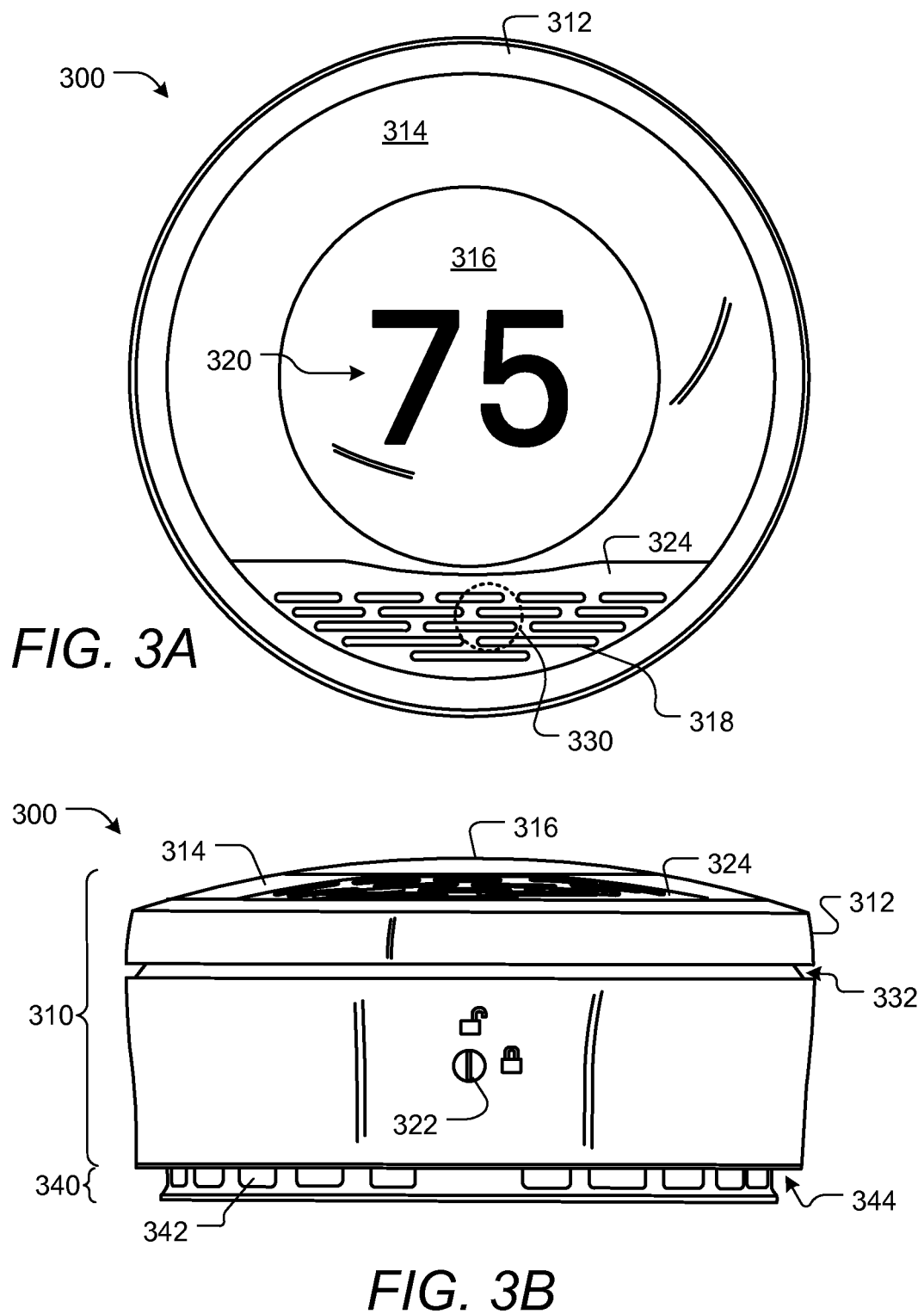
FIGS. 3A-C illustrate a thermostat having a user friendly interface, according to some embodiments.
Figure 3C:
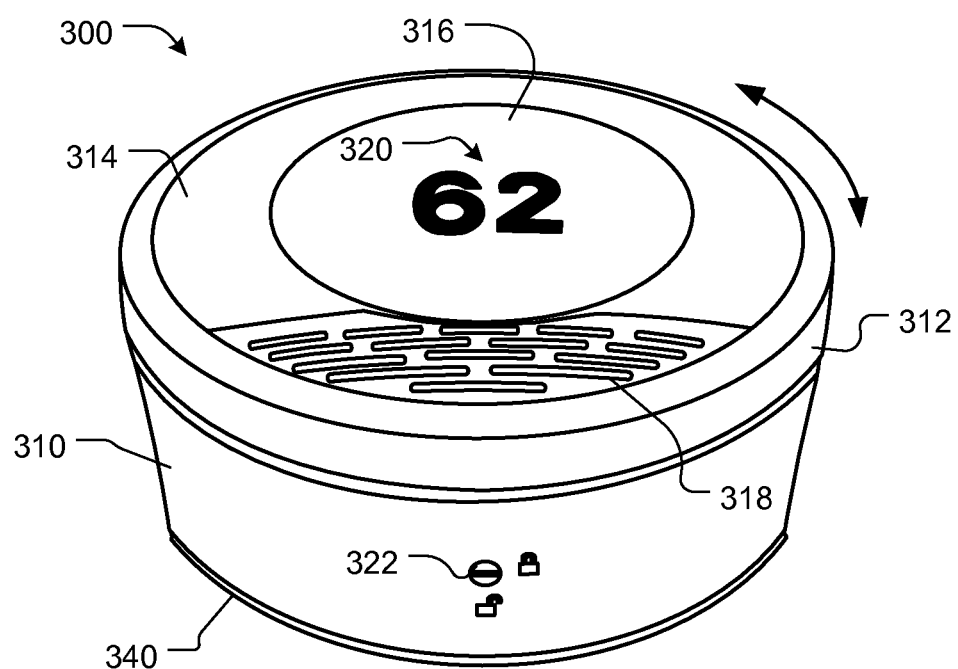

FIGS. 3A-C illustrate a thermostat having a user friendly interface, according to some embodiments. Unlike so many prior art thermostats, thermostat 300 preferably has a sleek, simple, uncluttered and elegant design that does not detract from home decoration, and indeed can serve as a visually pleasing centerpiece for the immediate location in which it is installed. Moreover user interaction with thermostat 300 is facilitated and greatly enhanced over conventional designs by the design of thermostat 300. The thermostat 300 includes control circuitry and is electrically connected to an HVAC system, such as is shown with thermostat 110 in FIGS. 1 and 2. Thermostat 300 is wall mounted and has circular in shape and has an outer rotatable ring 312 for receiving user input. Thermostat 300 has a large frontal display area 314. According to some embodiments, thermostat 300 is approximately 80 mm in diameter. The outer ring 312 allows the user to make adjustments, such as selecting a new target temperature. For example, by rotating the outer ring 312 clockwise, the target temperature can be increased, and by rotating the outer ring 312 counter-clockwise, the target temperature can be decreased. Within the outer ring 312 is a clear cover 314 which according to some embodiments is polycarbonate. Also within out ring 312 is a metallic portion 324, preferably having a number of windows 318. According to some embodiments, the surface of cover 314 and metallic portion 324 form a curved spherical shape gently arcing outward that matches a portion of the surface of rotating ring 312, as shown in the side view 3B.

According to some embodiments, the cover 314 is painted or smoked around the outer portion, but leaving a central display area 316 clear so as to facilitate display of information to users. According to some embodiments, the curved cover 314 acts as a lens which tends to magnify the information being displayed in display area 316 to users.

According to some embodiments central display area 320 is a dot-matrix layout (individually addressable) such that arbitrary shapes can be generated, rather than being a segmented layout. According to some embodiments, a combination of dot-matrix layout and segmented layout is employed. According to some embodiments, central display area 316 is a backlit color liquid crystal display (LCD). According to some embodiments, other display technologies can be used such as passive and/or monochrome LCD, organic light-emitting diode (OLED), or electronic ink (e-ink) display technology. E-ink, that reflects light while not drawing power is particularly well suited, according to some embodiments, since a thermostat typically does not require a particularly short refresh time and also benefits greatly from relatively low power consumption. An example of information is shown in FIG. 3A, which are central numerals 320.

According to some embodiments, metallic portion 324 has number of openings 318 so as to allow the use of a passive infrared proximity sensor 330 mounted beneath the portion 324. Openings 318 are used, according to some embodiments, since many useful materials are opaque to infrared energy in useful wavelengths such as about 10 microns.

Preferably, the outer ring 312 is mechanically mounted in a manner that provides a smooth yet viscous feel to the user, for further promoting an overall feeling of elegance while also reducing spurious or unwanted rotational inputs. According to some embodiments, rotating outer ring 312 rotates on plastic bearings and an optical digital encoder is used to measure the rotational movement and/or rotational position of the ring 312. According to other embodiments, other technologies such as mounting the rotating ring 312 on a central shaft may be employed.

According to some embodiments, ventilation is facilitated through gap 332 between the rotating ring 312 and the body of the head unit 310, through gap 344 between the head unit 310 and the backplate 340, and into the backplate 340 via vents 342. In general, air circulation through gaps 332 and 344 and through vents 342 serves two purposes. Firstly, the air circulation allows the ambient air to reach one or more sensors located inside the thermostat. Secondly, the air circulation allows electronics in the thermostat to cool such that heat from the electronics does not significantly effect the sensing of the ambient air characteristics. According to some embodiments, the vents 332, 344 and 342 are visually hidden from the user as shown in FIGS. 3A-3C, allows for a simple, visually uncluttered design that facilitates ease of use by users.

A locking mechanism is also provided that is engaged via turning the screw head 322 a quarter turn.

Figure 4A:
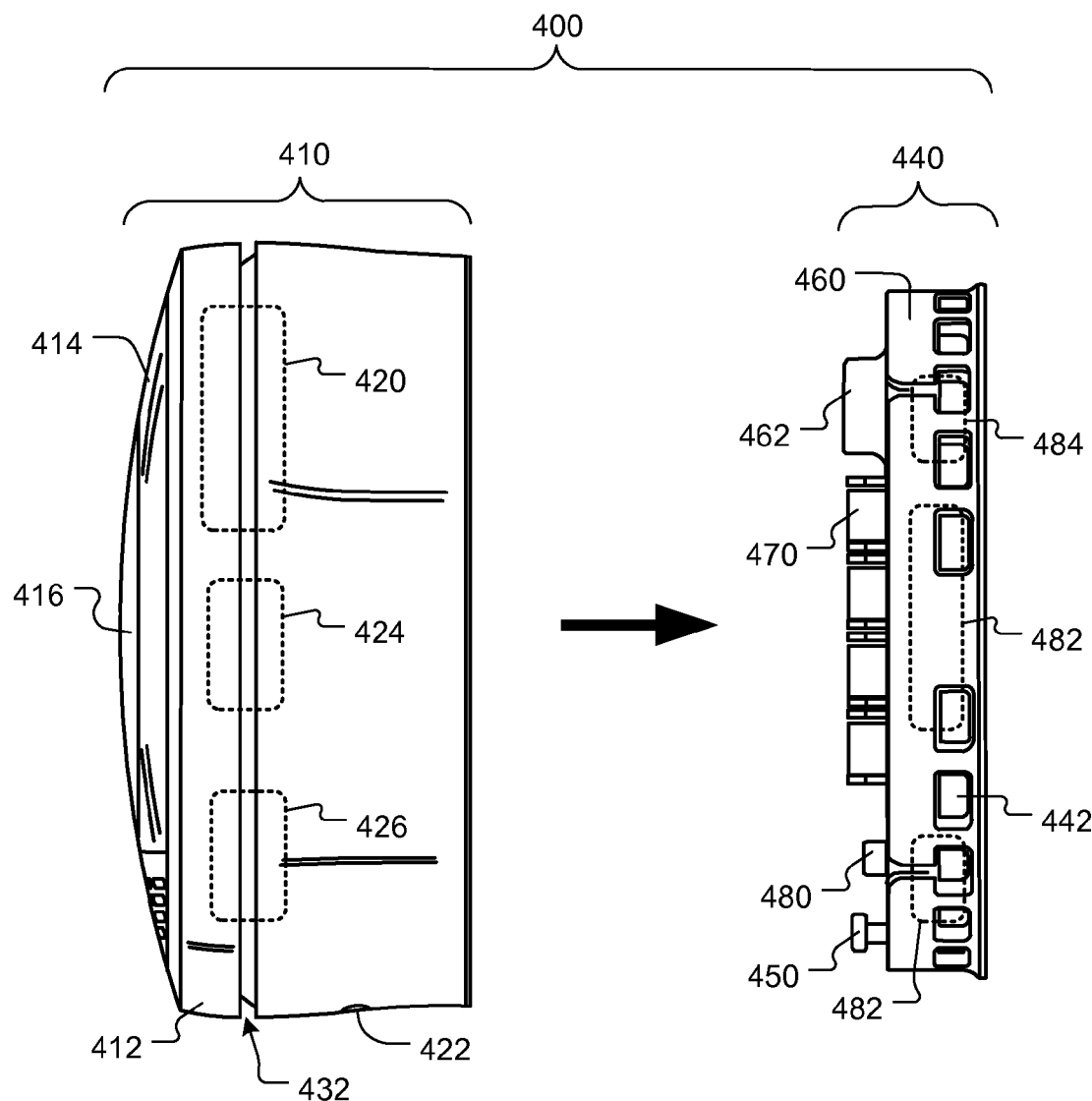
FIG. 4A illustrates a thermostat having a head unit and a backplate for ease of installation, configuration and upgrading, according to some embodiments.

FIG. 4A illustrates a thermostat having a head unit and a backplate (or wall dock) for ease of installation, configuration and upgrading, according to some embodiments. Thermostat 400 is preferably designed as shown in and described with respect to FIGS. 3A-C. As in the case of thermostat 300, thermostat 400 is wall mounted and has circular in shape and has an outer rotatable ring 412 for receiving user input. Thermostat 400 has a cover 414 that includes a display area 416. Head unit 410 of round thermostat 400 slides on to back plate 440. According to some embodiments the connection of the head unit 410 to backplate 440 can be accomplished using magnets, bayonet, latches and catches, tabs or ribs with matching indentations, or simply friction on mating portions of the head unit 410 and backplate 440.

According to some embodiments, a locking mechanism is provided wherein a post 450 on the backplate 440 is engaged by a quarter turn of a latch. According to some embodiments a flat head screw head is used for the latch. According some other embodiments other types screw heads can be used to provide greater security such as when the thermostat is being installed in public locations. According to some embodiments, the head unit 410 includes a processing system 420, display driver 424 and a wireless communications system 426. The processing system 420 is adapted to cause the display driver 424 and display area 416 to display information to the user, and to receiver user input via the rotating ring 412, as is described in greater detail herein. The processing system 420, according to some embodiments, is capable of maintaining and updating a thermodynamic model for the enclosure in which the HVAC system is installed. For further detail on the thermodynamic modeling, see U.S. patent Ser. No. 12/881, 463 filed Sep. 14, 2010, which is incorporated by reference herein. According to some embodiments, the wireless communications system 426 is used to communicate with devices such as personal computers and/or other thermostats or HVAC system components.

Backplate 440 includes electronics 482 and temperature sensor 484 in housing 460, which are ventilated via vents 442. A bubble level 462 is provided to aid in the correctly orienting the thermostat when mounting on a wall. Wire connectors 470 are provided to allow for connection to HVAC system wires. Connection terminal 480 provides electrical connections between the head unit 410 and backplate 440.

Figure 4B:
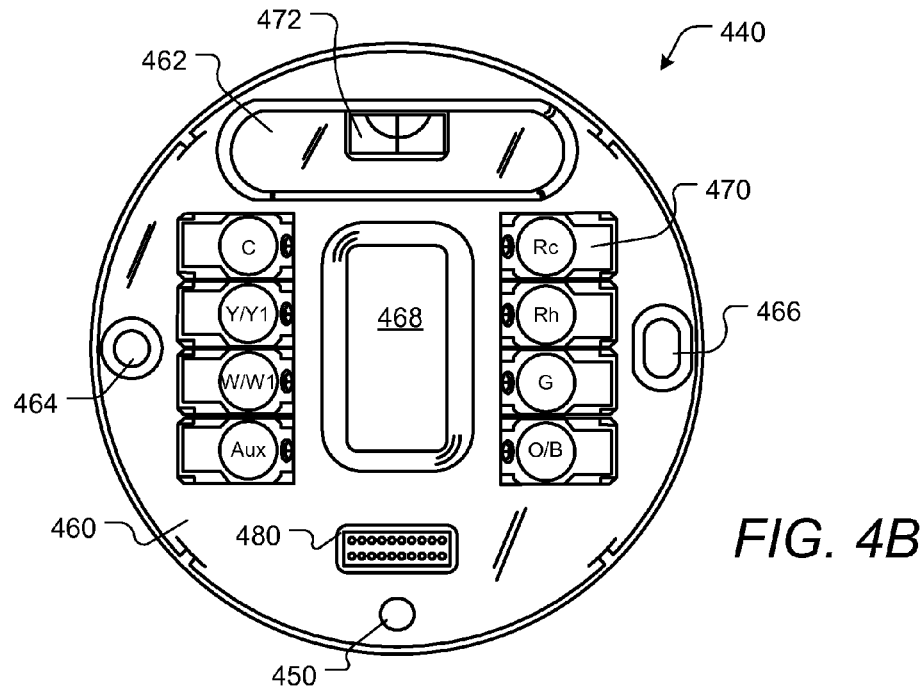
FIGS. 4B-C shows a top and bottom view of a thermostat backplate, according to some embodiments.
Figure 4C:
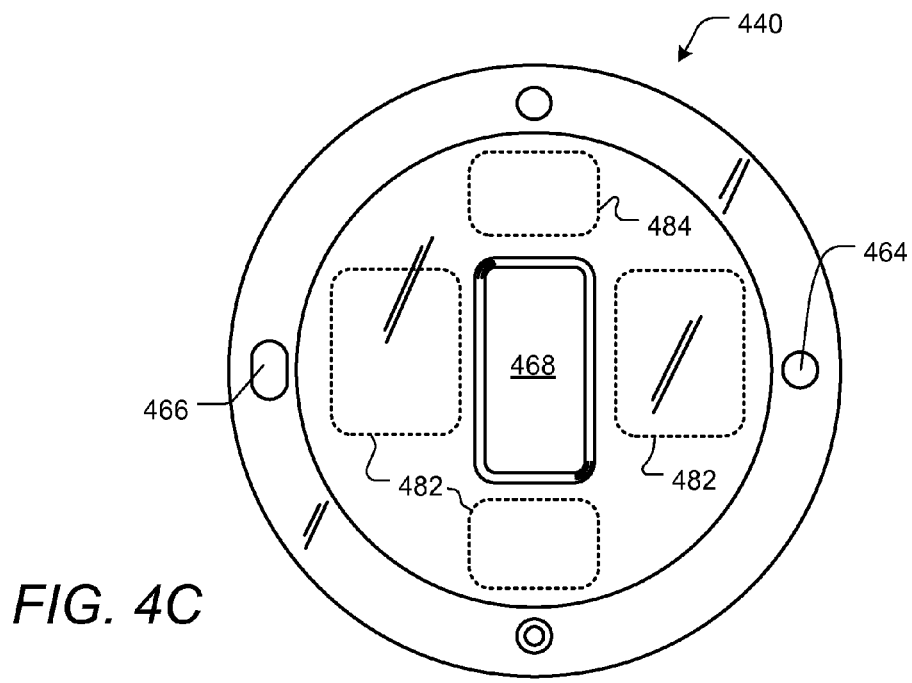

FIGS. 4B-C shows a top and bottom view of a thermostat backplate, according to some embodiments. The backplate 440 is mounted on a wall using screws through two openings: round hole 464 and slotted hole 466. By using a slotted shaped hole 466, the user or installer can make small adjustments in the angle of mounting of backplate 440. As shown in FIG. 4B, backplate 440 includes a bubble level 462 including a window 472 through which the user can check and make a level mounting of backplate 440 on a wall. The HVAC system wires pass through a large rectangular opening 468 and are connected to wire connectors 470. According to some embodiments, eight wire connectors are provided as shown in FIG. 4B, and labeled with common HVAC system wire names. FIG. 4C shows the back of backplate 440, the side that will face the wall when thermostat 400 is wall mounted. Temperature sensor 484 is includes and allows the backplate 440 to operate as a fully functional thermostat even when not connected to the headunit 410. For example, the backplate electronics 482 includes an MCU processor, and driver circuitry for opening and closing the HVAC control circuits, thereby turning on and turning off the one or more HVAC functions such as heating and cooling. The electronics 482 also includes flash memory which is used to store the series of programmed settings that take effect at different times of the day, such that the programmed set point changes can be carried out even when the headunit 410 is not attached to the backplate 440. According to some embodiments, the electronics 482 also includes power harvesting circuitry so obtain power from the HVAC control circuit(s) even when an HVAC common power wire is not available.

The docking capability of headunit 410, according to some embodiments, provides many advantages and opportunities in both a technology sense and a business sense. Because the headunit 410 can be easily removed and replaced by even the most non-technically-savvy customer, many upgrading and upselling opportunities are provided. For example, many different versions of the headunit 410 can be separately sold, the different versions having different colors, styles, themes, and so forth. Upgrading to a new headunit 410 having more advanced capabilities becomes a very easy task, and so the customer will be readily able to take advantage of the newest display technology, sensor technology, more memory, and so forth as the technology improves over time.

Figure 15:
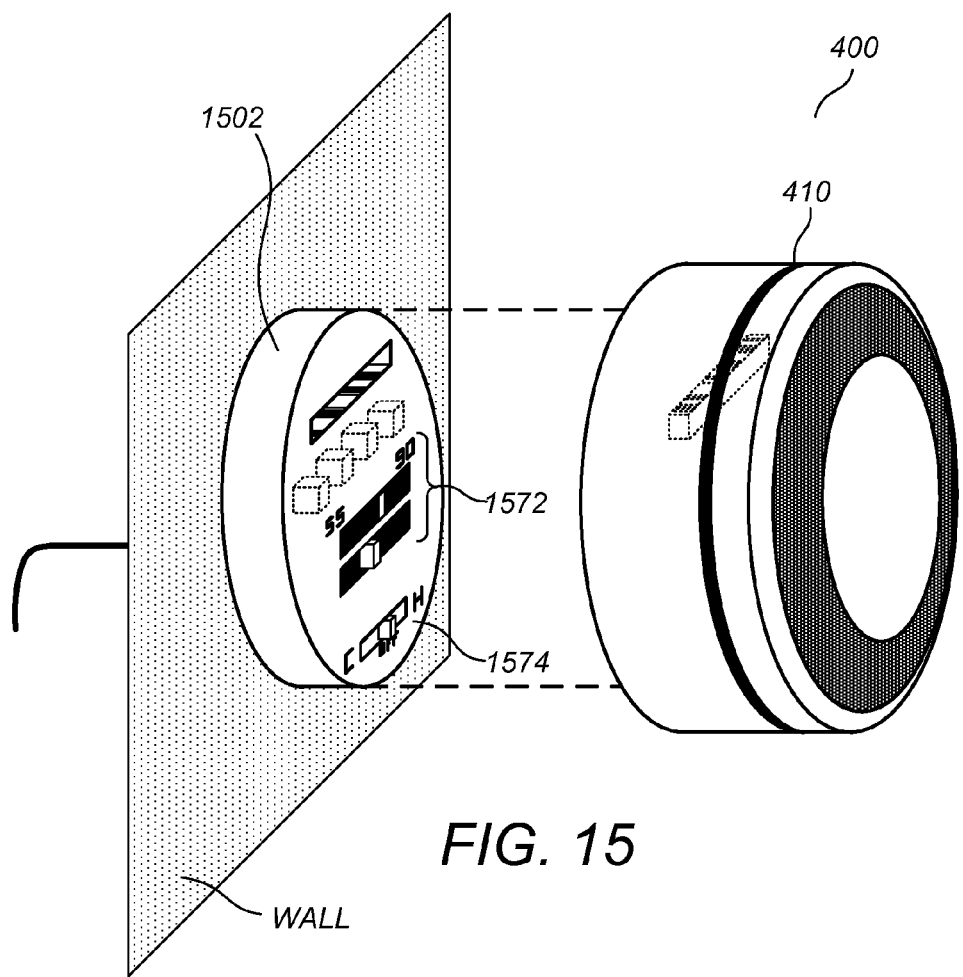
FIG. 15 illustrates an exploded perspective view of a thermostat having an HVAC-coupling wall dock, according to some embodiments.

FIG. 15 illustrates an exploded perspective view of the headunit 410 and an HVAC-coupling wall dock 1502 according to an embodiment. The HVAC coupling wall dock 1502, according to some embodiments, includes a standard temperature readout/setting dial 1572 and a simple COOL-OFF-HEAT switch 1574, and can function as an elemental, standalone thermostat when the headunit 410 is removed. This can prove useful for a variety of situations, such as if the headunit 410 needs to be removed for service or repair for an extended period of time over which the occupants would still like to remain reasonably comfortable. For one embodiment, the elemental thermostat components 1572 and 1574 are entirely mechanical in nature, such that no electrical power is needed to trip the control relays. For other embodiments, simple electronic controls such as electrical up/down buttons and/or an LCD readout are provided. For other embodiments, some subset of the advanced functionalities of the headunit 410 can be provided, such as elemental network access to allow remote control, to provide a sort of "brain stem" functionality while the "brain" (the headunit 410) is temporarily away.

Figure 5A:
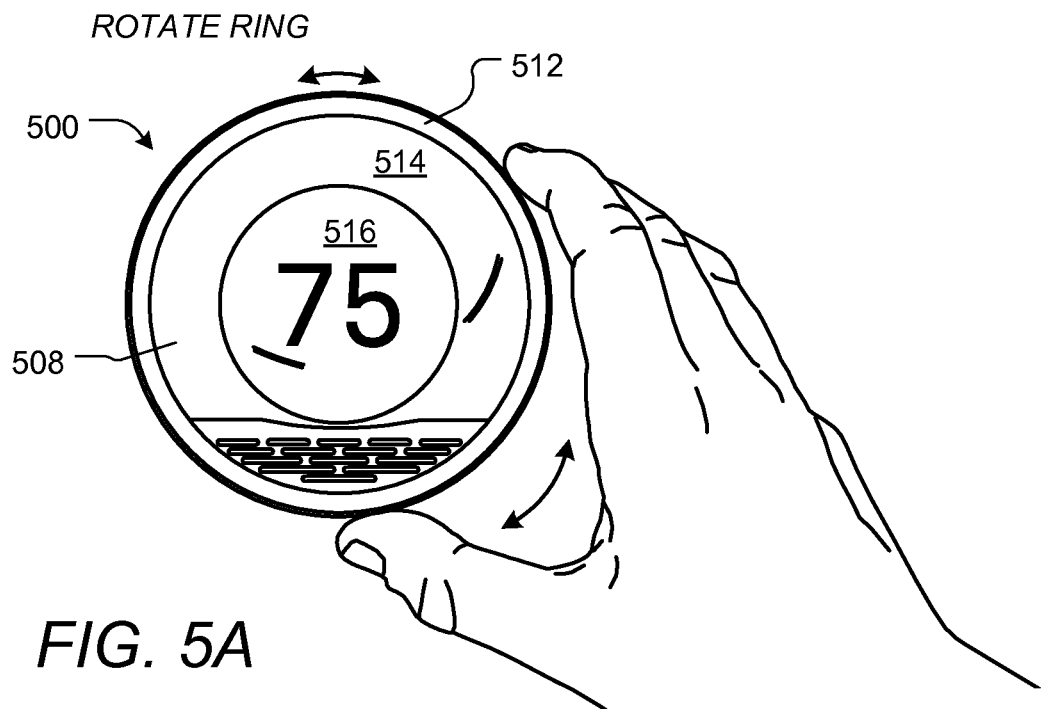
FIGS. 5A-B illustrate a thermostat as it is being controlled by the hand of a user according to some embodiments.
Figure 5B:
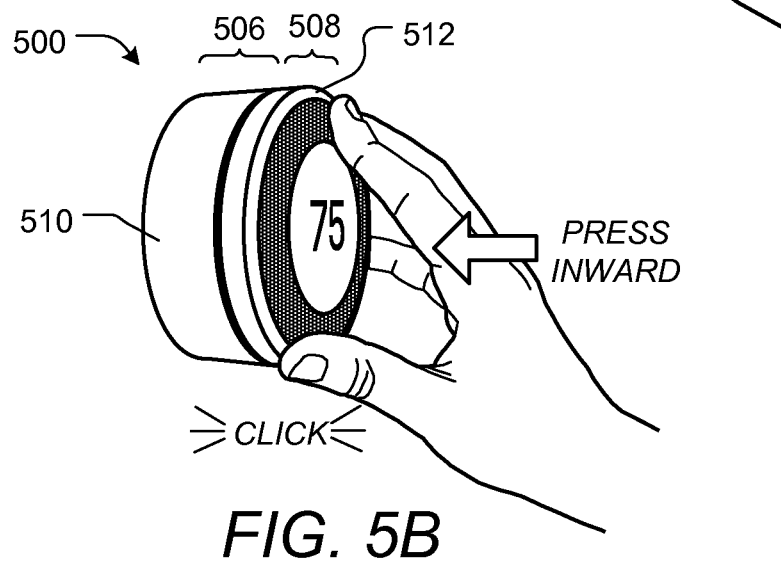

FIGS. 5A-B illustrate a thermostat as it is being controlled by the hand of a user according to some embodiments. Thermostat 500 is preferably designed as shown in and described with respect to FIGS. 3A-C and 4A-C. As in the case of thermostats 300 and 400, thermostat 500 is wall mounted and has circular in shape and has an outer rotatable ring 512 for receiving user input. Thermostat 500 has a cover 514, which includes a display area 516. Head unit 510 of round thermostat 500 slides on to back plate (not shown). The head unit 510 includes an upper cap 508 and a main body 506. The upper cap 508 includes the rotating ring 512, cover 514 and display area 516.

According to some embodiments, for the combined purposes of inspiring user confidence and further promoting visual and functional elegance, the thermostat 500 is controlled by only two types of user input, the first being a rotation of the outer ring 512 (FIG. 5B) (referenced hereafter as an "rotate ring"), and the second being an inward push on the upper cap 508 (FIG. 5C) until an audible and/or tactile "click" occurs. According to some embodiments, the inward push of FIG. 4C only causes the outer ring 512 to move forward, while in other embodiments the entire upper cap 508 moves inwardly together when pushed. Preferably, cover 514 does not rotate with outer ring 512. According to some embodiments, pushing inward of upper cap 508 can include multiple types of user input. A single brief push inward until the audible and/or tactile click occurs followed by a release (single click) can be interpreted as one type of user input (referenced hereafter as an "inward click"). Pushing the upper cap 508 and holding the inward pressure for an amount of time such as 1-3 seconds can be interpreted as another type of user input (referenced hereafter as a "press and hold"). According to some embodiments, other types of input can be interpreted by a user such as double and/or multiple clicks, and pressing and holding for longer and/or shorter periods of time. According to other embodiments, speed-sensitive or acceleration-sensitive rotational inputs may be implemented (e.g., a very large and fast leftward rotation specifies an "Away" occupancy state, while a very large and fast rightward rotation specifies an "Occupied" occupancy state).

Figure 6A:
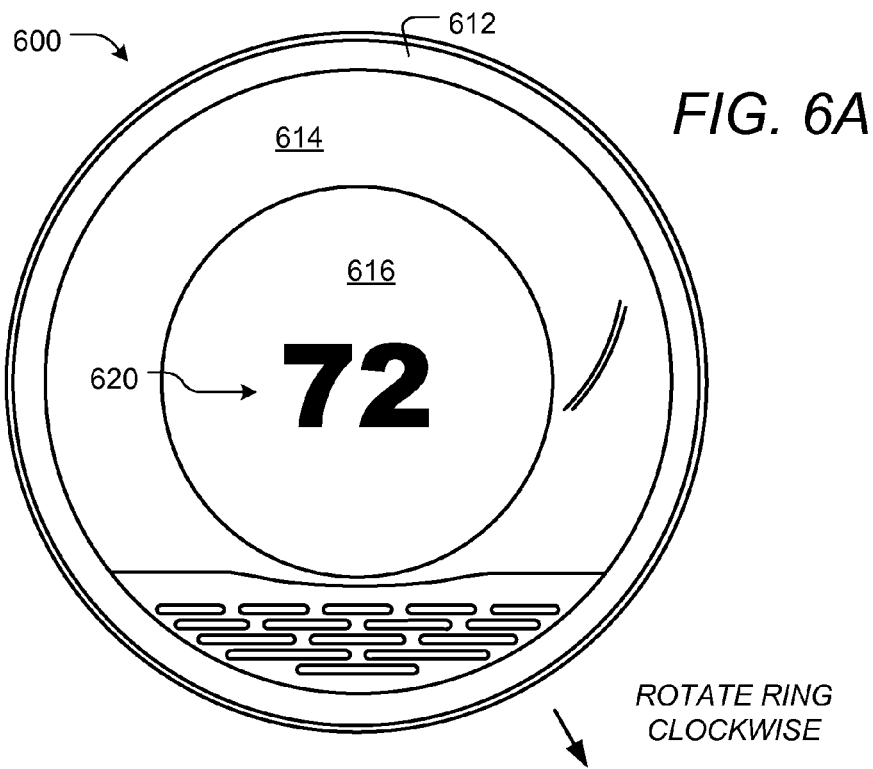
FIGS. 6A-F illustrate basic user interactions with a thermostat, according to some embodiments.

FIGS. 6A-F illustrate basic user interactions with a thermostat, according to some embodiments. Thermostat 600 is preferably designed as shown in and described with respect to FIGS. 3A-C, 4A-C and 5A-B. As in the case of thermostats 300, 400 and 500, thermostat 600 is wall mounted and has circular in shape and has an outer rotatable ring 612 for receiving user input, a cover 614 and a display area 616. Large central numerals 620 are shown in FIG. 6A, and in this case represent the current temperature. Although in FIGS. 6A-F the central numerals 620 are shown in black against a white background in display area 616, according so some embodiments the numerals 620 are displayed in white and the background of display area 616 indicates to a user the HVAC function currently be used. According to some embodiments, displaying a black background in area 616 indicates that the HVAC system is neither currently heating nor currently cooling.

Figure 6B:
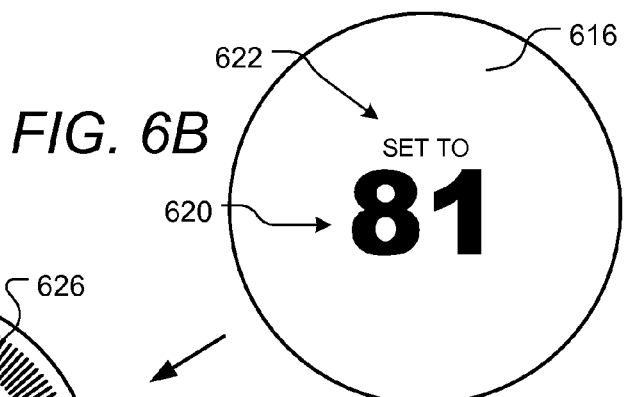

According to some embodiments, a user can change the set point of thermostat 600 by rotating the ring 612. In the example shown in FIGS. 6A-F, rotating the ring in a clockwise causes an increase in set point temperature, such as show in FIG. 6B. In FIG. 6B, the set point temperature has been increased to 81 degrees in response to the user rotating ring 612 in a clockwise direction. Central numerals 620 display "81" and the text 622 displays "SET TO" to indicate the new current set point temperature. According to some embodiments, after a short period of about 1-5 seconds, the display 616 changes to that of FIG. 6C. The text 622 changes to "HEATING TO" to indicate to the user that the HVAC heating system is currently being activated. The central numerals 620 remain displaying 81, which is the current set point temperature. The background color in area 616 is changed to indicate the heating function, which according to some embodiments is a shade of red and/or orange. According to some embodiments the color can also be used to indicate the amount of heating that will be required to reach the current set point. For example, more saturated or brighter colors indicate that a greater amount of heating will be required, and more unsaturated or darker colors indicate that a lesser amount of heating will be required. According to some embodiments, the time to reach the set point temperature is displayed textually in text 624 and/or graphically using bars 626. For further details of calculating and displaying time to reach set point temperature, please refer to U.S. patent Ser. No. 12/984,602, filed Jan. 4, 2011, which is incorporated by reference herein.

Figure 6C:
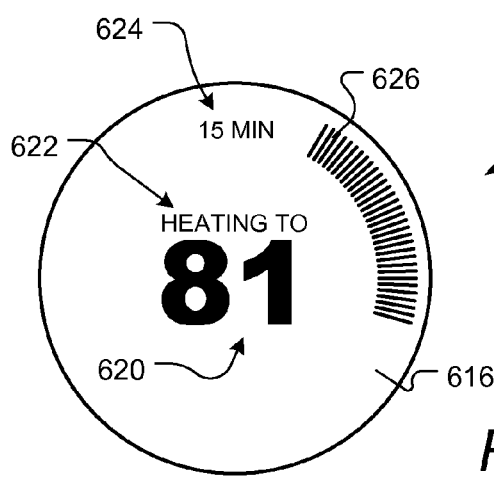

According to some embodiments, the display area 616 alternates between showing the current temperature, as in FIG. 6A, and the set point temperature, as in FIG. 6C. In this way, when the HVAC system is active, and/or anytime the set point temperature is different from the current temperature, both types of information can be displayed to users. According to some embodiments, the frequency of alternating the displays is about 3-5 seconds.

Figure 6D:
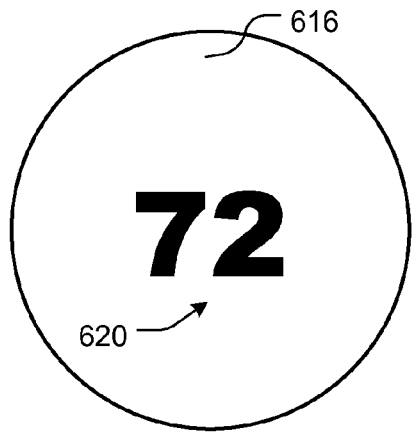
Figure 6E:
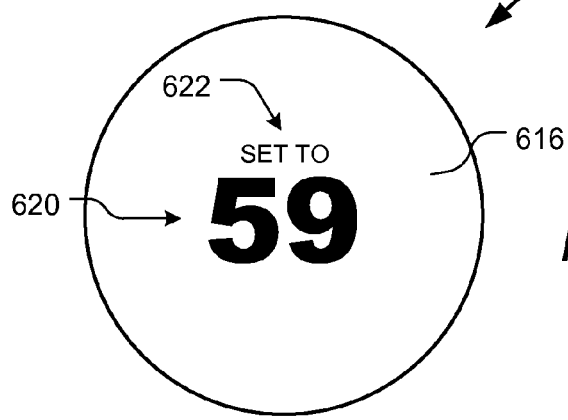

In FIG. 6E, the set point temperature has been decreased to 59 degrees in response to the user rotating ring 612 in a counter-clockwise direction from the starting point shown in FIG. 6D. Central numerals 620 display "59" and the text 622 displays "SET TO" to indicate the new current set point temperature. According to some embodiments, after a short period of about 1-5 seconds, the display 616 changes to that of FIG. 6F. The text 622 changes to "COOLING TO" to indicate to the user that the HVAC heating system is currently being activated. The central numerals 620 remain displaying 59, which is the current set point temperature. The background color in area 616 is changed to indicate the cooling function, which according to some embodiments is a shade of blue. According to some embodiments the color can also be used to indicate the amount of heating that will be required to reach the current set point. For example, more saturated or brighter colors indicate that a greater amount of cooling will be required, and more unsaturated or darker colors indicate that a lesser amount of cooling will be required. According to some embodiments, the time to reach the set point temperature is displayed textually in text 624 and/or graphically using bars 626.

Figure 6F:
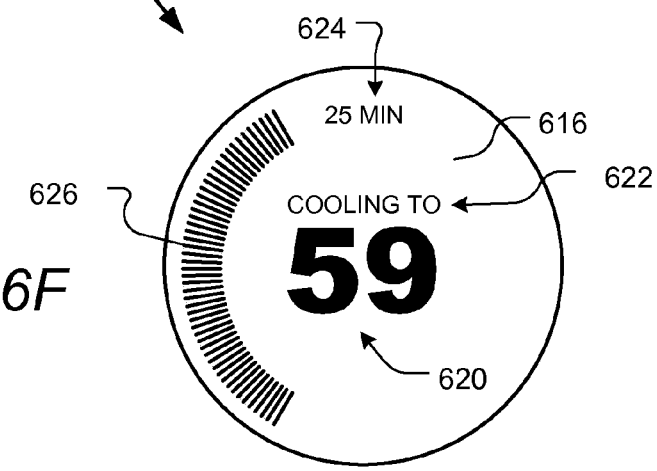

According to some embodiments, the display area 616 alternates between showing the current temperature, as in FIG. 6D, and the set point temperature, as in FIG. 6F. In this way, when the HVAC system is active, and/or anytime the set point temperature is different from the current temperature, both types of information can be displayed to users. According to some embodiments, the frequency of alternating the displays is about 3-5 seconds.

Figure 7A:
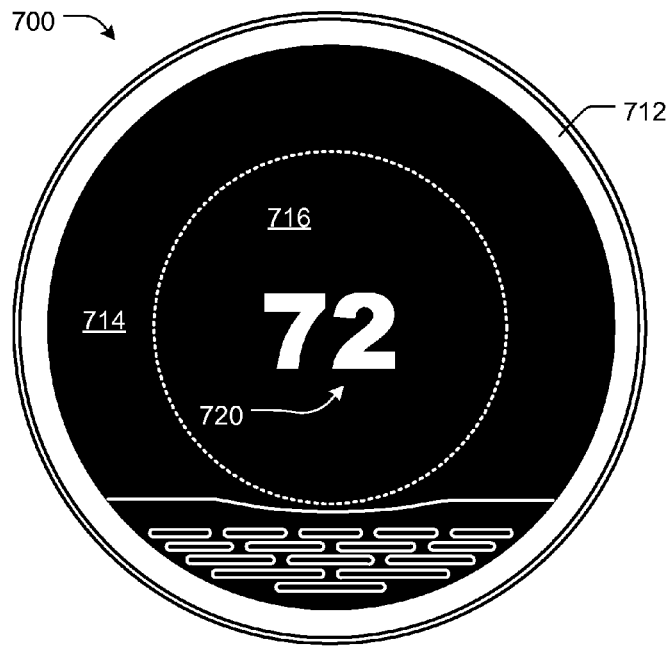
FIGS. 7A-P illustrate a thermostat having a user interface capable of viewing and editing future set points and review historical information, according to some embodiments.

FIGS. 7A-P illustrate a thermostat having a user interface capable of viewing and editing future set points and review historical information, according to some embodiments. Thermostat 700 is preferably designed as shown in and described with respect to FIGS. 3A-C, 4A-C, 5A-B, and 6A-F. As in the case of thermostats 300, 400, 500 and 600, thermostat 700 is wall mounted and has circular in shape and has an outer rotatable ring 712 for receiving user input, a cover 714 and a display area 716 marked by the dotted white circle. Large central numerals 720 are shown in FIG. 7A, and in this case represent the current temperature. According to some embodiments, in FIG. 7A, the background of display area 716 is black indicating that the HVAC system is inactive (i.e. neither currently heating nor currently cooling) and numerals 720 are white.

Figure 7B:
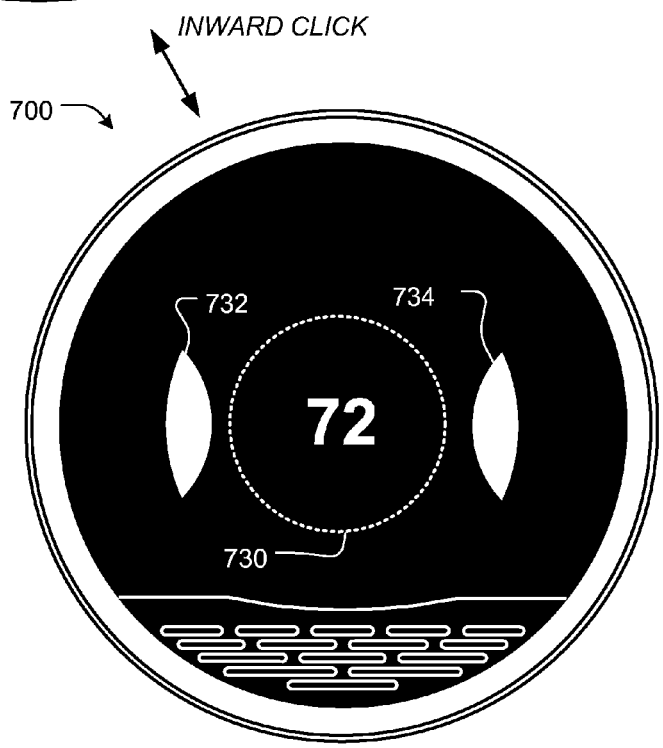

According to some embodiments, the future scheduled program and/or historical information are accessed by the user via a inward click. FIG. 7B show the thermostat 700 immediately following an inward click. The information that was previously displayed showing the current status, in this case the current temperature of 72 is shrunk down in size as shown by the dotted ring 730 in FIG. 7B. Note that if the current status had shown current heating or cooling, such as with colors such as described with resect to FIGS. 6A-F above, the color and set point temperature would be displayed in the area within dotted ring 730 of FIG. 7B. The two partial circles 732 and 734 on the left and right sides of circle 730, respectively, indicate to the user that another screen lies to the left and right that can be accessed via rotating the ring 712.

FIG. 7C is a view of display 716 as shown in FIG. 7B. In response to a ring rotation the program schedule is accessed. FIG. 7D shows that later today, as indicated by the text 740 "TODAY" at 10 pm, as indicated by the text 742 "10 PM," the set point is scheduled to be changed to 65, as indicated by the numerals 720 "65." Note that the two partial circles 732 and 734 are shown to aid the user in navigation. In the example shown in FIG. 7D, the left partial circle 732 is shown in black, or whatever color was being used to indicate the current status, as discussed with respect to FIGS. 7A-C. By rotating the ring further in the same direction (e.g. clockwise), the further programmed set points, shown in FIGS. 7E, 7F and 7G are progressively displayed. By rotating the ring 712 in the opposite direction (e.g. counter-clockwise), progressively earlier programmed set points are displayed.

Figure 7H:
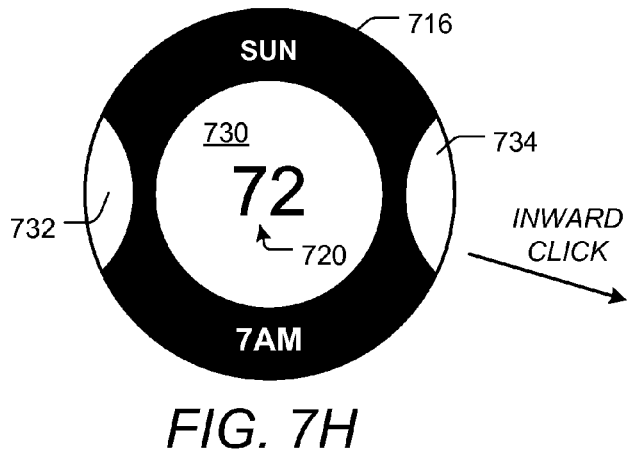
Figure 7I:
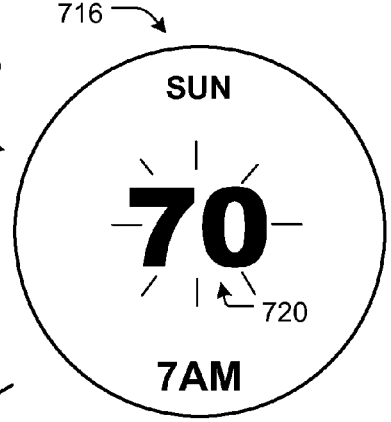
Figure 7J:
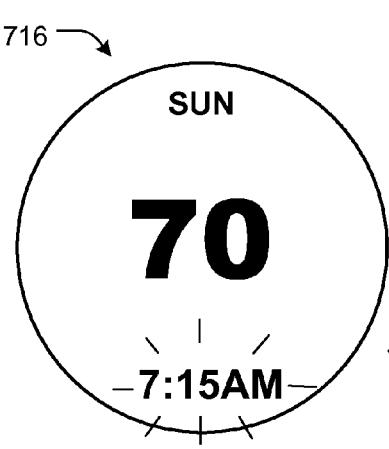
Figure 7K:
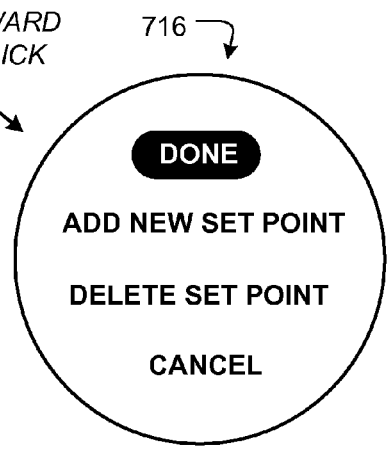

According to some embodiments the scheduled program can be edited by a user. From any of the displayed programmed set points, such as shown in screen 716 in FIG. 7H, an inward click is used to indicate the desire to edit the set point. In response to an inward click, the white inner circle 730 expands to fill the display area 716 as shown in FIG. 7I. The set point temperature indicated by numerals 720 also blinks that indicates to the user the value that will be altered by rotating ring 712. When the desired set point temperature is set using the ring 712, another inward click will advance to FIG. 7J. In FIG. 7J, the time blinking, and is adjusted using the rotating ring 712. When the desired set point temperature is set using the ring 712, another inward click will advance to FIG. 7K. In FIG. 7K, the user uses the rotating ring 712 to select one of four choices lists. The selected choice is highlighted in black or a different suitable contrasting color or using an outline. The choices shown in FIG. 7K are: "DONE" which will accept the changes and take the user back to the displayed schedule screen shown in FIG. 7H; "ADD NEW SET POINT" which will add a new programmed set point change for the given day; "DELETE SET POINT" which sill delete the current programmed set point; and "CANCEL" which will return the user to the displayed schedule screen without making any changes. According to some embodiments, the thermostat has a predefined number of set points (such as 4 per day=28 per week) which can each be edited as shown in FIGS. 7I and 7J, but for simplicity and ease of use, the user cannot add new set points or delete set points.

According to some embodiments, historical information can be displayed to the user as shown in FIGS. 7L-P. FIG. 7L shows the display area 716 as in FIG. 7A. An inward click from a user causes the display are 716 to change to the navigation mode shown in FIG. 7M which corresponds to display area 716 in FIG. 7B. By rotating the ring in the opposite direction as would cause the display of future programmed set points (such as shown in FIGS. 7D-G), a display of historical information can be accessed by the user. According to some embodiments, as shown in FIG. 7N historical temperature can be displayed in graphical form. For further details on interactively displaying historical information, see FIGS. 13 and 14A-B.

FIGS. 8A-F illustrates how other thermostat settings can be made using a user interface, according to some embodiments. FIG. 8A shows a display area 816 that corresponds to the display area 316, 416, 516, 616 and 716 in the previous figures and as described herein. In FIG. 8A, the thermostat is displaying a current temperature of 72, for examples using numerals 820. According to some embodiments, settings are accessed by an inward press and hold of the upper cap of the thermostat. The settings navigation screen shown in FIG. 8B, following a press an hold, where the current temperature is shown with numerals 820, two partial circles 832 and 834 indicate to the user that by rotating the outer ring further settings screens can be accessed. The word "SETTINGS" is displayed text 840 to indicate to the user that the settings menu is being displayed. By rotating the ring, various settings can be displayed and edited. For example, FIG. 8C shows a screen for setting Fahrenheit or Celsius and FIG. 8D shows a screen for setting WiFi access. According to some embodiments, the particular setting is viewed and can be altered by a press and hold operation while the desired setting type is being displayed. For example, if a user wanted to update the WiFi settings, a press and hold from screen 8D would cause a display of the current WiFi settings such as the name of the network currently being used, and an option to select a different network and/or enter network security passwords.

According to some embodiments, the settings mode is exited by navigating to the "DONE" screen shown in FIG. 8E, and then making an inward click. According to some embodiments, the a coin flip transition is used to indicate to the user that a mode is being change, in this case as shown in FIG. 8F, the coin flip transition indicates the transition from Settings Mode back to current display. Thus, according to some embodiments, transitions between screens can graphically indicated to the user in different ways including: a coin-flip transition (see e.g. FIG. 8F); a shrinking or growing portion of the display (see e.g. 7A and 7B); and a translation or shifting of displayed elements from right-to-left or from left-to-right (see e.g. FIGS. 7C-G).

FIGS. 9A-D illustrate a thermostat having a user interface capable of entering textual information, according to some embodiments. Thermostat 900 is preferably designed as shown in and described with respect to FIGS. 3A-C, 4A-C, 5A-B, 6A-F and 7A-P. As in the case of thermostats 300, 400, 500, 600 and 700, thermostat 900 is wall mounted and has circular in shape and has an outer rotatable ring 912 for receiving user input, a cover 914 and a display area 916. In FIG. 9A, a screen is shown that allows the user to enter capital letters into the entry window 922 by rotating the outer ring 912 which causes the letters to rotate around the outer area of display area 916, and when the desired character is positioned within the window 920 the character is selected by a inward click operation. Other than the capital letters: the check mark 950 is used to indicate the text entry operation is finished the selected text should be accepted; the back arrow 952 is used to indicate the text entry operation should be cancelled; a symbol 954 representing another group of characters should be selected for input; and a backspace symbol 956 is used to delete the most recently entered character. FIG. 9B illustrates the lower case characters, and FIGS. 9C and 9D show numbers and various other characters that can be entered.

Figure 10A:
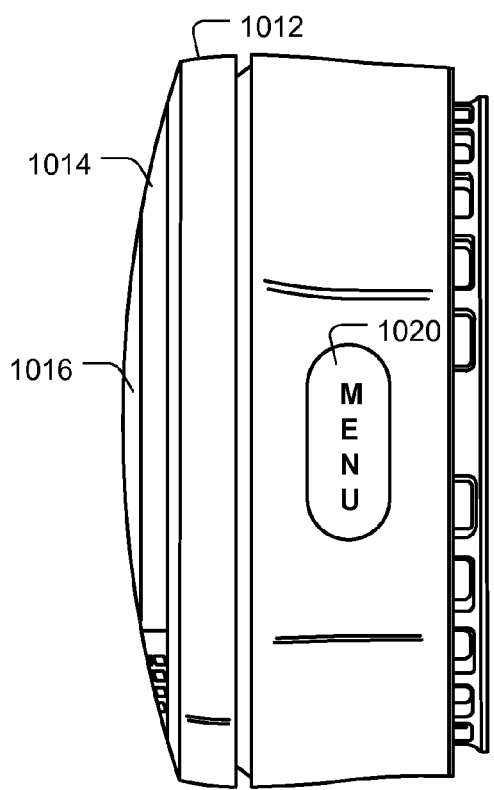
FIGS. 10A and 10B show a thermostat having further buttons to facilitate user input and navigation, according to some embodiments.
Figure 10B:
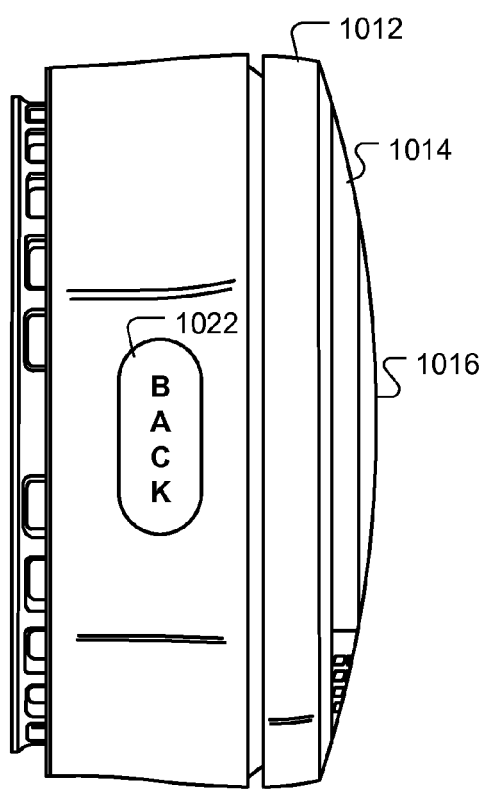

FIGS. 10A and 10B show a thermostat having further buttons to facilitate user input and navigation, according to some embodiments. Thermostat 1000 is preferably designed as shown in and described with respect to FIGS. 3A-C, 4A-C, 5A-B, 6A-F, 7A-P and 9A-D. As in the case of thermostats 300, 400, 500, 600, 700 and 900, thermostat 1000 is wall mounted and has circular in shape and has an outer rotatable ring 1012 for receiving user input, a cover 1014 and a display area 1016. According to some embodiments, the settings screen of FIG. 8B can be accessed, for example by using an dedicated button 1020 labeled "MENU" or "SETTINGS" or the like as shown in FIG. 10A. According to some embodiments, the user can reverse the navigation through the various screens and menus by pressing a dedicated button 1022 labeled "BACK" as shown in FIG. 10B.

Figure 11A:
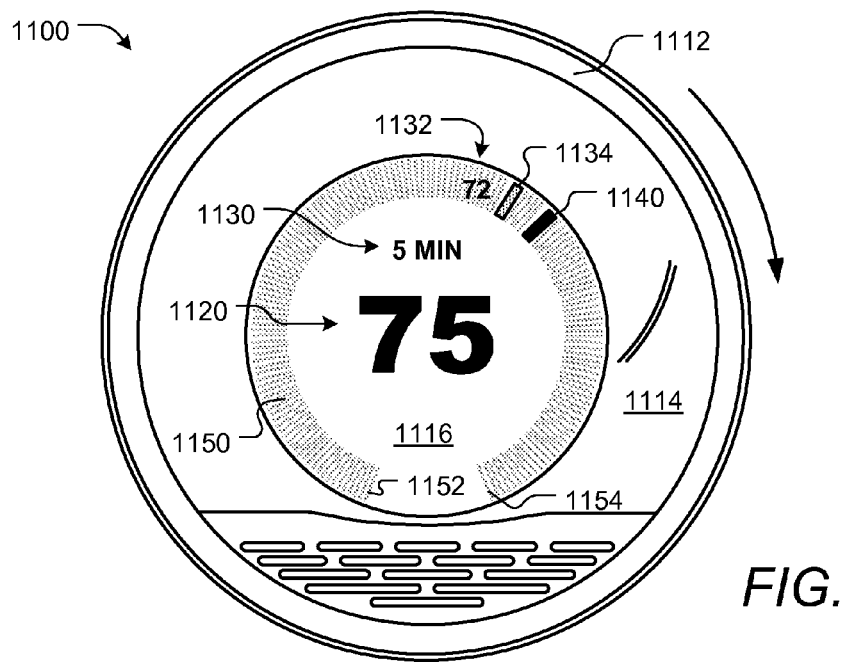
FIGS. 11A-B illustrate further aspects of a user interface for a thermostat according to some embodiments.
Figure 11B:
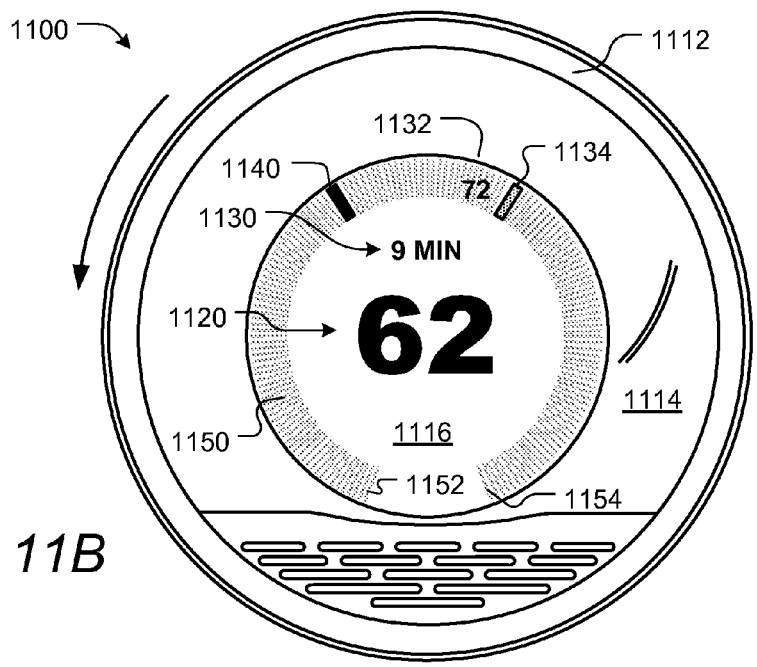

FIGS. 11A-B illustrate further aspects of a user interface for a thermostat according to some embodiments. Thermostat 1100 is preferably designed as shown in and described with respect to FIGS. 3A-C, 4A-C, 5A-B, 6A-F, 7A-P, 9A-D and FIGS. 10A-B. As in the case of thermostats 300, 400, 500, 600, 700, 900 and 1000, thermostat 1100 is wall mounted and has circular in shape and has an outer rotatable ring 1112 for receiving user input, a cover 1114 and a display area 1116. FIGS. 11A and 11B show further detail of portions of the user interface while the user is adjusting the set point temperature using rotating ring 1112, according to some embodiments. As in some prior figures, the display 1116 is illustrated with black characters and graphics against a white background for clarity, although according to some preferred embodiments, the characters and graphics are shown in white or some other bright color against a background that is either black or some other color as might be used to indicate current HVAC functionality. When the user rotates the ring 1112 in either direction, thermostat 1100 responds by displaying scale tick marks 1150 around the outer area of display 1116 as shown. According to some embodiments, the tick marks 11150 are shown in decreased contrast with respect to the background, such as decreased brightness in cases there the information is displayed in lighter colors against a darker background. For example, according to some embodiments, the scale ticks 1150 are shown at a brightness value of 75, where a value of 100 represents full brightness. The current temperature is shown by numerals 1132, and graphically along the tick scale 1150 by current temperature tick 1134. According to some embodiments, current temperature tick 1134 is wider than the scale ticks 1150 and/or have higher contrast from the background, such as a brightness value of 86 against a darker background. As the rotating ring 1112 is moved by the user in the clockwise direction, the set point temperature is adjusted in an upward direction. The set point temperature is displayed numerically using central numerals 1120 and graphically in the form of a set point tick 1140. According to some embodiments, the set point tick is wider and/or has even higher contrast than the current temperature tick 1134, for example a brightness value of 100 against a darker background. Also shown is the estimated time to reach the set point temperature 1130. Note that the location of the set point tick 1140 depends on the set point temperature, with higher temperatures being represented in the clockwise direction and lower temperatures in the counter-clockwise directions. In FIG. 11B, the set point temperature is being adjusted to be lower than the current temperature (for example, when the user is calling for cooling rather than heating) in which case the set point tick 1140 is shown to the left of the current temperature tick 1134. According to some embodiments, the current temperature numerals 1132 is located on the left side of the of the current temperature tick 1134 while heating and on the right side when cooling. Note also that the ends 1152 and 1154 of the scale ticks 1150 can represent the safety minimum temperature and maximum temperature, respectively. According to some embodiments, after a suitable amount of time, such as three seconds, of user inactivity (i.e. no further rotation of ring 1112), the scale ticks 1150 fade to transparent. Note that although in this example, clockwise is used for higher temperatures and counter clockwise for lower temperatures, according to some embodiment these directions are reversed.

Figure 12A:
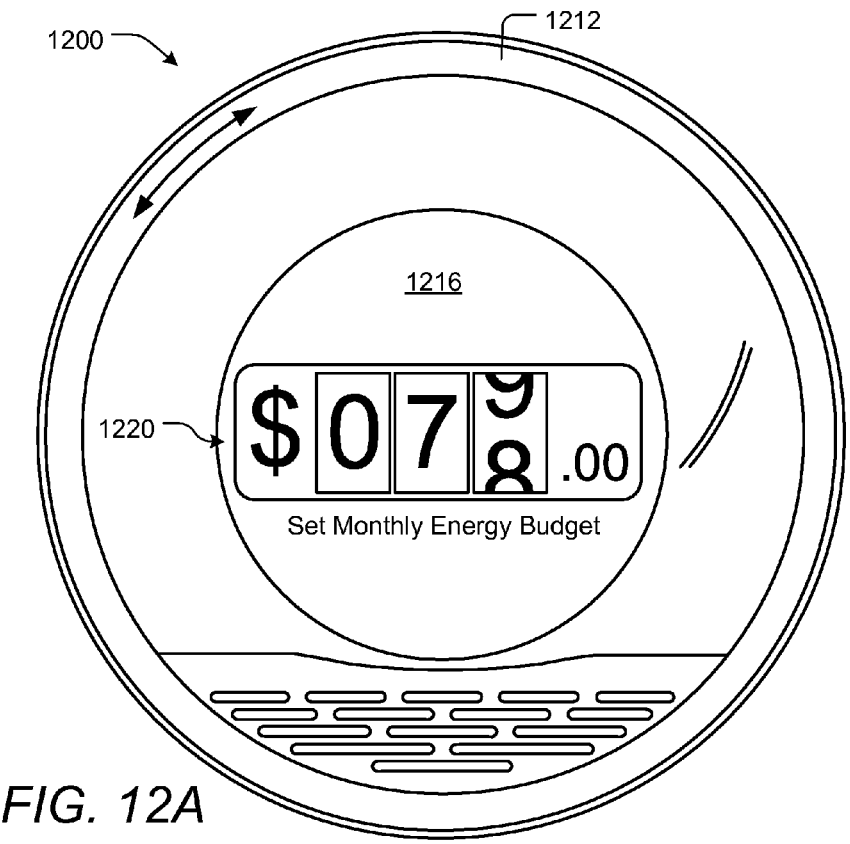
FIGS. 12A-C illustrate aspects of a thermostat user interface, according to some embodiments.
Figure 12B:
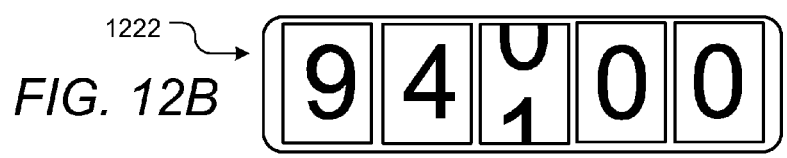
Figure 12C:
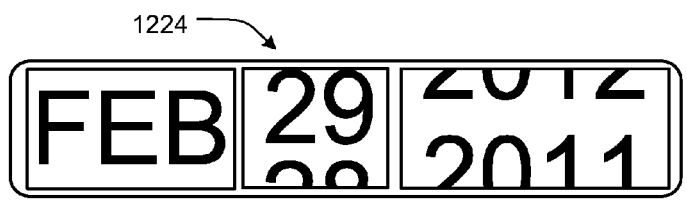

FIGS. 12A-C illustrate aspects of a thermostat user interface, according to some embodiments. It has been found that the rotating ring user input device is particularly well suited to certain types of interactive display techniques. In particular, according to some embodiments, displaying rotating dials of numbers and/or characters have been found to be particularly useful when obtaining user input for fields of data that are of a fixed character length, and have limited possible characters in each character position. The rotating dial display has been found to give the user positive feedback in terms of quickly finding the correct characters that need to be input. FIG. 12A shows thermostat 1200 having a rotating ring 1212 and circular display area 1216. A display 1220 is used for obtaining the user's preference for a monthly budget. According to one embodiment, each of the three dollar numerals individually set using the rotating ring 1212 and then accepted using a inward click. According to another embodiment, the entire dollar amount, that is, all three digits is adjusted at once using the dial. FIG. 12B shows an example of a display 1222 for entering numerals in a U.S. ZIP code. A similar dial format can be used for combinations of letters and numbers such as are used in other geographic locations. FIG. 12C shows a date entry display 1224. Note that according to some embodiments, when the year field is changed from 2012 to 2011, for example, the day number field automatically changes to a valid day number, for example from 29 to 28.

Figure 13:
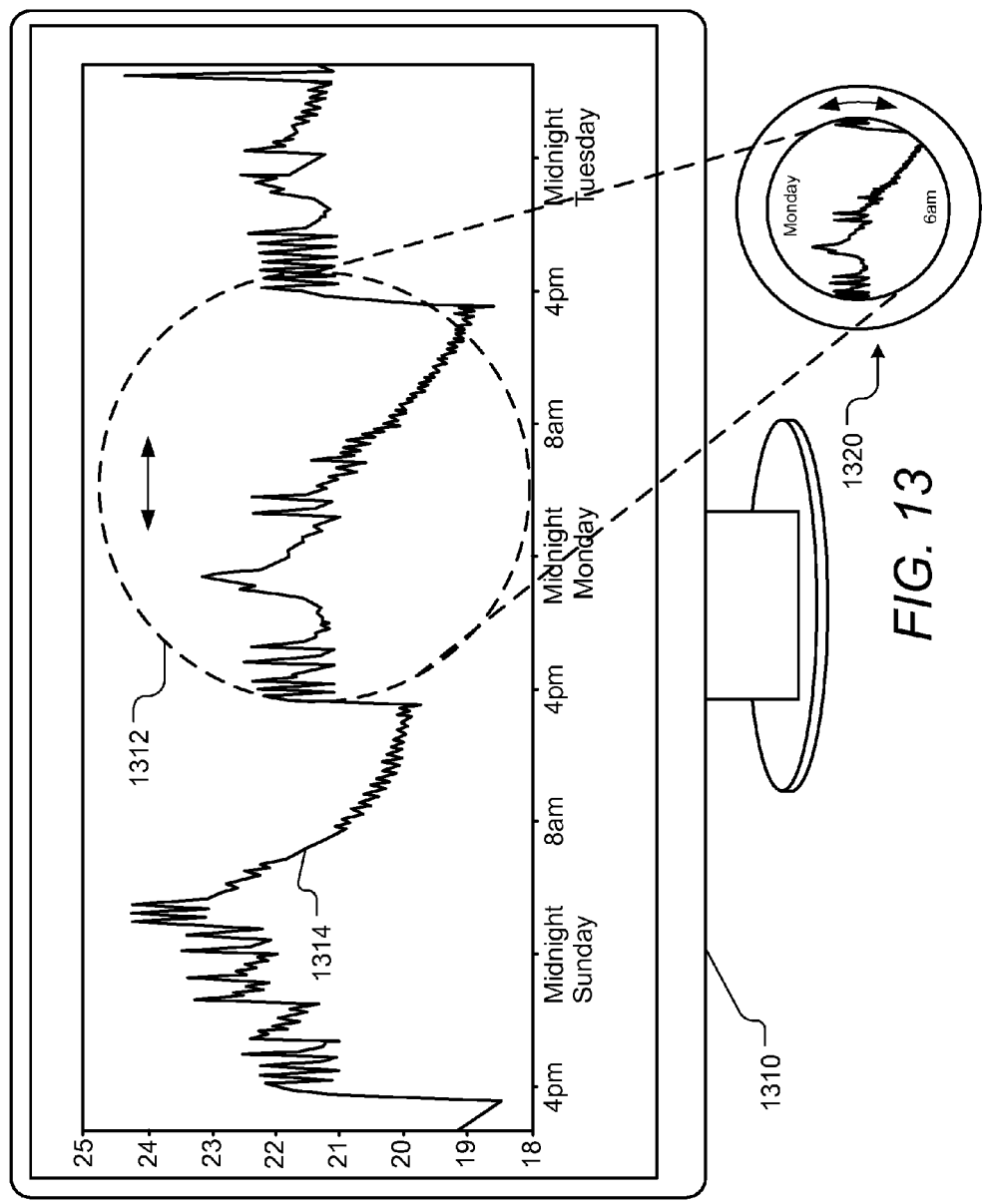
FIG. 13 shows the relationship between a computer display and thermostat display, according to some embodiments.

FIG. 13 shows the relationship between a computer display and thermostat display, according to some embodiments. In this example, historical temperature information is represented by curve 1314 and is being displayed to a user on a computer display 1310. The same information can be viewed by a user on the circular display of the thermostat 1320 using a combination of ring rotation and inward clicks, as is described herein. The historical display can be navigated to by a user as described, for example, with respect to FIGS. 7L-P. In the case shown in FIG. 13, the historical temperature data within the window 1312 is shown to the user in the circular display of thermostat 1320. According to some embodiments, the display shifts to the left and right using the rotating ring and is zoom-able, using a combination of inward click and rotating the ring.

Figure 14A:
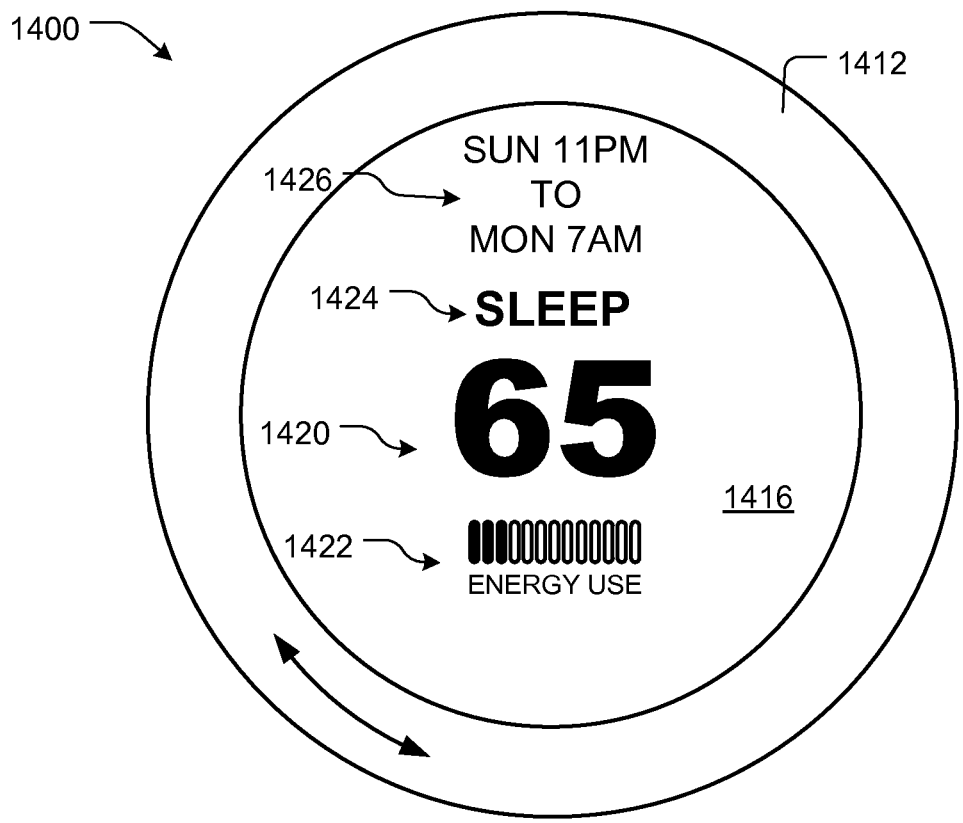
FIGS. 14A-B show a thermostat having an interactive user interface, according to some embodiments.
Figure 14B:
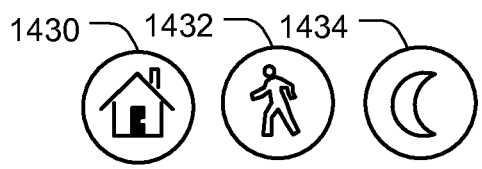

FIGS. 14A-B show a thermostat having an interactive user interface, according to some embodiments. Thermostat 1400 has a rotating ring 1412 and a circular display 1416 as shown. The display 1416 is being used to display historical information to the user, and can correspond to a screen such as shown in FIGS. 7N-P. The time period 1426, set temperature 1420, relative energy use 1422 and occupancy mode 1424 is displayed as shown. Note that other forms of display can be used, according to other embodiments. For example, in FIG. 14B, icons 1430, 1432 and 1434 are used to symbolically display to the user occupancy modes for "home," "away," and "sleep," respectively.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A thermostat, comprising:
a back plate;
a detachable head unit that is configured to be detachably coupled to the back plate;

a processing system that includes a head unit processor included in the detachable head unit and a back plate processor included in the back plate;

a display that is part of the detachable head unit, that is configured to display information, and that is controlled by the head unit processor;

a first user input device that is part of the detachable head unit and that receives user input, which is processed by the head unit processor to control one or more HVAC functions in an HVAC system;

a second user input device that is formed by one or more HVAC controls located the back plate, that is exposed when the detachable head unit is detached, and that enables user input of one or more HVAC settings to be used to control the one or more HVAC functions in the HVAC system when the detachable head unit is detached;

a back plate memory located in the back plate for storing the one or more HVAC settings inputted via the second user input device, which is exposed when the detachable head unit is detached;

wherein, when the detachable head unit is coupled to the back plate, the head unit processor controls the one or more functions in the HVAC system;

wherein, when the detachable head unit is detached from the back plate, the back plate processor controls the one or more HVAC functions in the HVAC system according to the one or more HVAC settings stored in the back plate memory.

2. A thermostat according to claim 1 wherein the back plate is wall mountable.

3. A thermostat according to claim 1 wherein the one or more HVAC settings are programmed settings stored in the back plate memory that take effect at different times of the day.

4. A thermostat according to claim 1 wherein the detachable head unit further includes a rechargeable battery.

5. A thermostat according to claim 1 wherein the detachable head unit further includes a wireless communication system.

6. A thermostat according to claim 1 wherein the head unit is removeably attached to the back plate using one or more types selected from a group consisting of: friction, tab and indentation, magnet, and bayonet.

7. A method, comprising:
receiving, at a detachable head unit of a thermostat, a first input corresponding to an interaction with a first input device of the detachable head unit, the detachable head unit including a head unit processor and a display configured to display information, the thermostat including a back plate that includes a back plate processor and one or more HVAC controls that form a second input device, wherein the second input device is exposed when the detachable head unit is detached so as to enable user input when the detachable head unit is detached;

causing, by the head unit processor of the detachable head unit, at least a portion of the first input to be transmitted to the back plate processor of the back plate;

storing, by the back plate processor of the back plate, at least a portion of the first input in a back plate memory of the back plate of the thermostat;

controlling, by the head unit processor of the detachable head unit, one or more functions in an HVAC system according to the first input;

receiving, at the back plate processor of the back plate of the thermostat, an indication that the detachable head unit has been detached;

controlling, by the back plate processor of the back plate, the one or more functions in the HVAC system according to the at least the portion of the first input stored in the back plate memory of the back plate of the thermostat;

receiving, at the back plate of the thermostat, a second input corresponding to a second interaction with the second input device that is exposed when the detachable head unit is detached, wherein the second interaction occurs when the detachable head unit is detached; and controlling, by the back plate processor of the back plate, the HVAC system according to the second input;

wherein, when the detachable head unit is coupled to the back plate, the head unit processor controls the one or more functions in the HVAC system;

wherein, when the detachable head unit is detached from the back plate, the back plate processor controls the one or more functions in the HVAC system according to the first or second input stored in the back plate memory.

8. A thermostat back plate that attaches to and communicates with a detachable head unit and that functions as a standalone thermostat when the detachable head unit is detached, the detachable head unit including a display configured to display information, a first user input device configured to receive user input, and a head unit processor configured to control the display, the thermostat back plate comprising:

a second user input device formed by one or more HVAC controls that are exposed when the detachable head unit is detached from the thermostat back plate so as to enable a user to input into the thermostat back plate one or more HVAC settings; and a back plate processor that detects when the detachable head unit is detached from the thermostat back plate and that controls one or more HVAC functions of an HVAC system according to the one or more HVAC settings inputted via the second user input device of the thermostat back plate when the detachable head unit is detached from the thermostat back plate;

wherein, when the detachable head unit is coupled to the back plate, the head unit processor controls the one or more functions in the HVAC system;

wherein, when the detachable head unit is detached from the back plate, the back plate processor controls the one or more functions in the HVAC system according to the one or more HVAC settings stored in the back plate memory.

9. A thermostat back plate according to claim 8, further comprising:
a back plate memory that stores one or more HVAC settings and the back plate processor obtains the one or more HVAC settings from the back plate memory.

10. A thermostat back plate according to claim 8 wherein the second user input device is mechanical in nature, such that no electrical power is needed.

11. A thermostat back plate according to claim 10 wherein the second user input device is a setting dial.

12. A thermostat back plate according to claim 10 wherein the second user input device is a COOL-OFF-HEAT switch.

13. A thermostat back plate according to claim 8 wherein the second user input device is electronic.

14. A thermostat back plate according to claim 13 wherein the one or more HVAC controls are one or more electrical up/down buttons.

15. A thermostat back plate according to claim 8 wherein the back plate memory obtains the one or more inputted HVAC settings from the detachable head unit via a connection terminal when the detachable head unit is attached to the thermostat back plate.

16. A thermostat according to claim 1 wherein wherein the second user input device is mechanical in nature, such that no electrical power is needed.

17. A thermostat according to claim 16 wherein wherein the second user input device is a setting dial.

18. A thermostat according to claim 17 wherein wherein the second user input device is a COOL-OFF-HEAT switch.

19. A method of claim 7 wherein the second user input device is mechanical in nature, such that no electrical power is needed.

20. A method of claim 19 wherein the second user input device is a COOL-OFF-HEAT switch.

* * * * *